US011635330B2

(12) United States Patent
Goldstein et al.

(10) Patent No.: US 11,635,330 B2
(45) Date of Patent: Apr. 25, 2023

(54) MICROCAVITY-ENHANCED OPTICAL BOLOMETER

(71) Applicant: Massachusetts Institute of Technology, Cambridge, MA (US)

(72) Inventors: Jordan Goldstein, Cambridge, MA (US); Christopher Louis Panuski, Somerville, MA (US); Dirk Robert Englund, Brookline, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 17/335,017

(22) Filed: May 31, 2021

(65) Prior Publication Data

US 2022/0236113 A1    Jul. 28, 2022

Related U.S. Application Data

(60) Provisional application No. 63/141,646, filed on Jan. 26, 2021.

(51) Int. Cl.
*G01J 5/08* (2022.01)
*G01J 5/0818* (2022.01)
*G01J 5/34* (2022.01)

(52) U.S. Cl.
CPC .......... *G01J 5/0853* (2013.01); *G01J 5/0818* (2013.01); *G01J 5/34* (2013.01)

(58) Field of Classification Search
CPC .......... G01J 5/0853; G01J 5/0818; G01J 5/34
See application file for complete search history.

(56) References Cited

U.S. PATENT DOCUMENTS 7,667,200 B1 * 2/2010 Watts .................. G01J 5/08
                                                        250/338.1
7,829,854 B2    11/2010 Wagner et al.
(Continued)

OTHER PUBLICATIONS

Backer et al., "Advances in uncooled technology at BAE systems." Infrared Technology and Applications XXIX. vol. 5074. International Society for Optics and Photonics, 2003. 10 pages.
(Continued)

*Primary Examiner* — Hugh Maupin
(74) *Attorney, Agent, or Firm* — Smith Baluch LLP

(57) ABSTRACT

Optical microcavity resonance measurements can have readout noise matching the fundamental limit set by thermal fluctuations in the cavity. Small-heat-capacity, wavelength-scale microcavities can be used as bolometers that bypass the limitations of other bolometer technologies. The microcavities can be implemented as photonic crystal cavities or micro-disks that are thermally coupled to strong mid-IR or LWIR absorbers, such as pyrolytic carbon columns. Each microcavity and the associated absorber(s) rest on hollow pillars that extend from a substrate and thermally isolate the cavity and the absorber(s) from the rest of the bolometer. This ensures that thermal transfer to the absorbers is predominantly from radiation as opposed to from conduction. As the absorbers absorb thermal radiation, they shift the resonance wavelength of the cavity. The cavity transduces this thermal change into an optical signal by reflecting or scattering more (or less) near-infrared (NIR) probe light as a function of the resonance wavelength shift.

21 Claims, 14 Drawing Sheets

(56) References Cited

U.S. PATENT DOCUMENTS

| | | | | |
|---|---|---|---|---|
| 2005/0082480 | A1* | 4/2005 | Wagner | G02B 5/208 |
| | | | | 348/E5.09 |
| 2014/0160336 | A1* | 6/2014 | Englund | H04N 5/30 |
| | | | | 348/335 |
| 2015/0124252 | A1* | 5/2015 | Pervez | G01J 3/02 |
| | | | | 356/326 |
| 2015/0362425 | A1* | 12/2015 | Goldsmith | G01N 21/7746 |
| | | | | 356/402 |
| 2018/0266889 | A1* | 9/2018 | Tao | G01J 5/0818 |
| 2021/0381900 | A1* | 12/2021 | Carr | G01J 3/42 |
| 2022/0107223 | A1* | 4/2022 | Ram | G01J 5/24 |

OTHER PUBLICATIONS

Bird 640-17μm, Ceramic. Semiconductor Devices 2018. Accessed at https://scdusa-ir.com/wp-content/uploads/2017/09/Bird640-17-ceramic.2018-1.pdf on Apr. 14, 2021. 2 pages.

Fujisawa et al., "Two-million-pixel SOI diode uncooled IRFPA with 15μm pixel pitch " Infrared Technology and Applications XXXVIII. vol. 8353. International Society for Optics and Photonics, 2012. 14 pages.

Ishii et al., "Temperature stability improvement of a QVGA uncooled infrared radiation FPA." Infrared Technology and Applications XXXIX. vol. 8704. International Society for Optics and Photonics, 2013. 9 pages.

Jerominek et al., "Vanadium oxide films for optical switching and detection." Optical Engineering 32.9 (1993): 2092-2099.

Kohin et al., "Performance limits of uncooled VOx microbolometer focal plane arrays." Infrared Technology and Applications XXX. vol. 5406. International Society for Optics and Photonics, 2004. 8 pages.

Li et al., "Overview of DRS uncooled VOx infrared detector development." Optical Engineering 50.6 (2011): 061017. 8 pages.

Lv et al., "Model-based low-noise readout integrated circuit design for uncooled microbolometers." IEEE Sensors Journal 13.4 (2013): 1207-1215.

Mizuno et al., "A black body absorber from vertically aligned single-walled carbon nanotubes." Proceedings of the National Academy of Sciences 106.15 (2009): 6044-6047.

Molesky et al., "Inverse design in nanophotonics." Nature Photonics 12.11 (2018): 659-670.

Rogalski, Infrared and Terahertz Detectors. CRC Press, 2019. 1067 pages.

Smith et al., "Dual band sensitivity enhancements of a VO x microbolometer array using a patterned gold black absorber." Applied Optics 55.8 (2016): 2071-2078.

Talghader et al., "Spectral selectivity in infrared thermal detection." Light: Science & Applications 1.8 (2012): e24-e24.

Tau 2 Longwave Infrared Thermal Camera Core. FLIR Systems, Inc. Accessed at https://www.flir.com/products/tau-2/ on Apr. 14, 2021. 2 pages.

Tissot et al., "High performance uncooled amorphous silicon VGA IRFPA with 17-μm pixel-pitch." Infrared Technology and Applications XXXVI. vol. 7660. International Society for Optics and Photonics, 2010. 8 pages.

Tohyama et al.,"Uncooled infrared detectors toward smaller pixel pitch with newly proposed pixel structure." Optical Engineering 52.12 (2013): 123105. 12 pages.

U3600 LCC Uncooled Infrared Sensor. Leonardo DRS 2012. Accessed at https://www.leonardodrs.com/media/10434/2019_u3600_lcc_mr-2012-04-615.rev05.pdf on Apr. 14, 2021. 2 pages.

U6160 LCC Uncooled Infrared Sensor. Leonardo DRS 2019. Accessed at https://www.leonardodrs.com/media/10436/2019_u6160_mr-2012_04-612_rev04.pdf on Apr. 14, 2021. 2 pages.

Wagner, "Solid state optical thermal imaging: performance update." Infrared Technology and Applications XXXIV. vol. 6940. International Society for Optics and Photonics, 2008. 13 pages.

Weiler et al., "Improvements of a digital 25 μm pixel-pitch uncooled amorphous silicon TEC-less VGA IRFPA with massively parallel Sigma-Delta-ADC readout." Infrared Technology and Applications XXXVII. vol. 8012. International Society for Optics and Photonics, 2011.

* cited by examiner

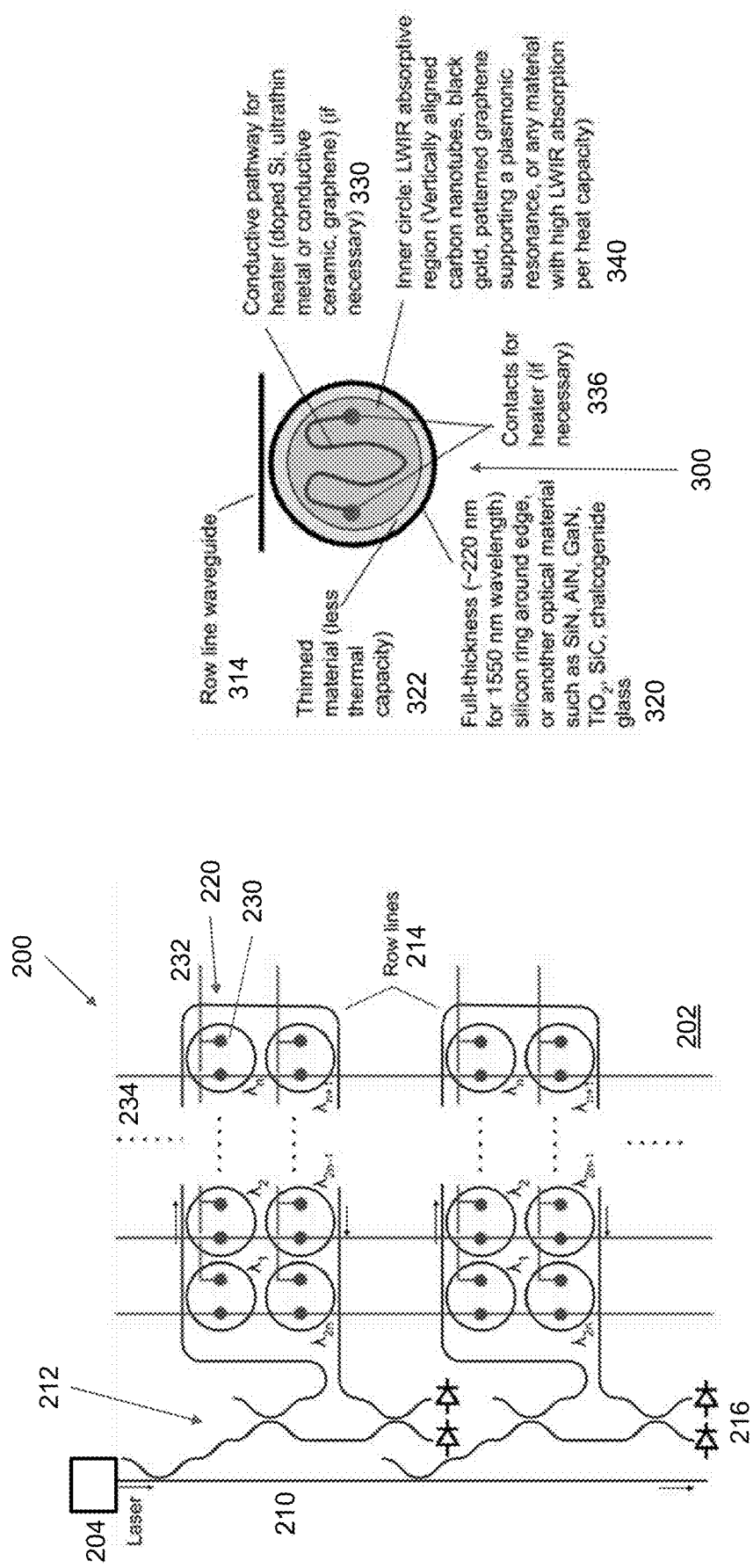

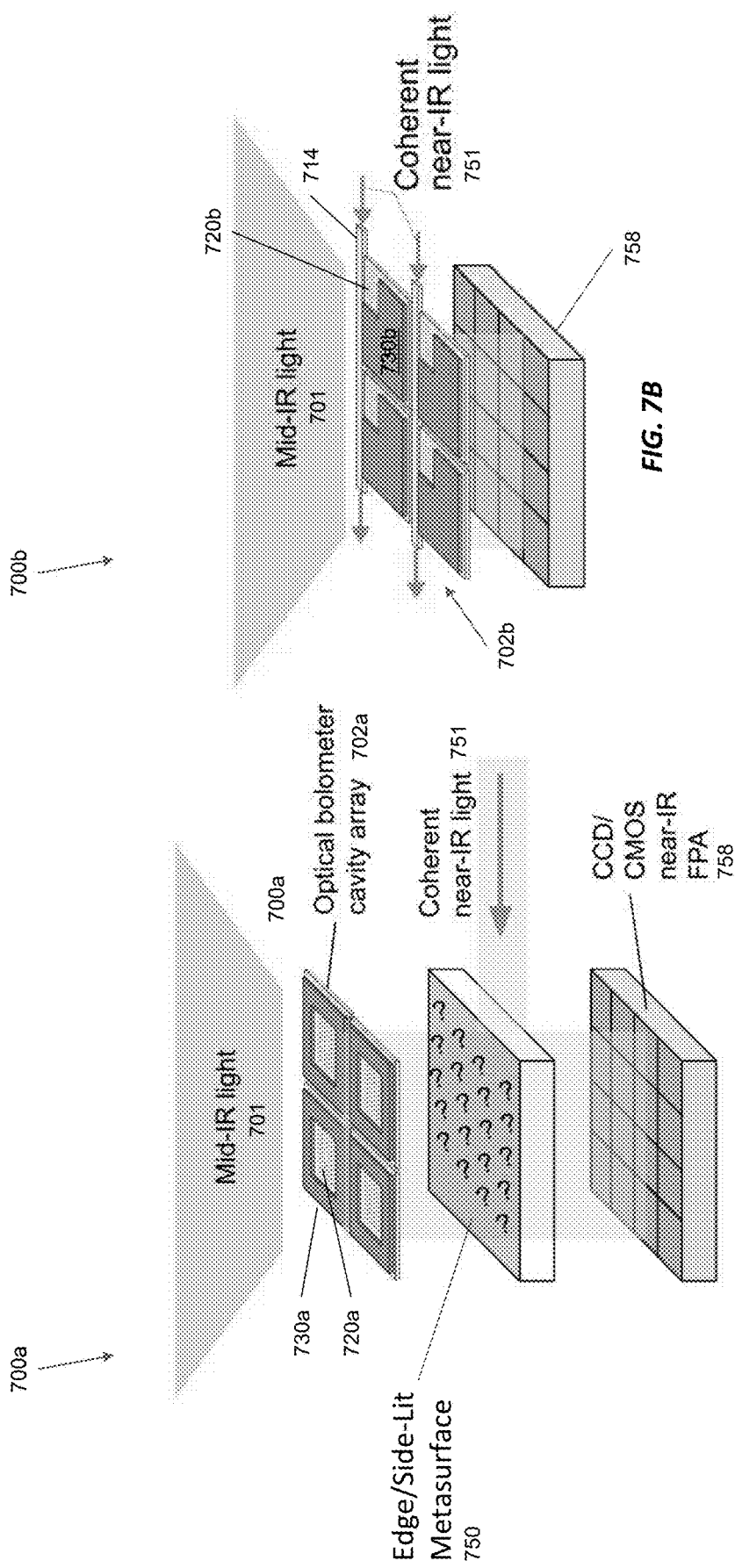

MICROCAVITY-ENHANCED OPTICAL BOLOMETER

CROSS-REFERENCE TO RELATED APPLICATION(S)

This application claims the priority benefit, under 35 U.S.C. 119(e), of U.S. Application No. 63/141,646, which was filed on Jan. 26, 2021, and is incorporated herein by reference in its entirety.

GOVERNMENT SUPPORT

This invention was made with Government support under Grant No. W911NF-18-2-0048 awarded by the Army Research Office. The Government has certain rights in the invention.

BACKGROUND

Thermal imaging is a technology with extensive applications in security, defense, research, manufacturing industry, HVAC work, and law enforcement. Thermal imagers can be divided into cooled and uncooled categories. Cooled thermal imagers have photon detectors in which a semiconductor material operated either in photovoltaic or photoconductive mode reads out carriers excited by incident long-wave infrared photons (LWIR, conventionally defined as the 7-14 µm wavelength range). The narrow bandgap required to absorb LWIR photons renders these photon detectors susceptible to thermal carrier generation noise. When cryogenically cooled to reduce this noise, their detectivities (D* ≡ √A/NEP for a detector area A and noise equivalent power NEP) approach the theoretical maximum set by the photon shot noise of a 300 K background.

In contrast, uncooled thermal imagers feature thermal pixels whose bulk temperature varies in response to the changes in scene temperature. These temperature changes are then read out via a temperature-dependent property of the sensitive element, e.g., a conductance in the case of a bolometer or a thermovoltage in the case of a thermocouple imager. Currently, the majority of uncooled thermal imagers use $VO_x$ as the temperature sensor. $VO_x$ undergoes a phase transition at about 68° C. where the material conductivity changes by a few orders of magnitude over a temperature range of only a few kelvins.

The performance of $VO_x$ bolometers, the most prevalent commercial room temperature LWIR sensor technology, is limited by noise sources associated with their photoconductive readout mechanism, such as 1/f (flicker) noise. The frequency-dependent detectivity of a $VO_x$ bolometer is given by:

$$D^*(f) = \frac{R\sqrt{A}}{\sqrt{S_V(f)}}$$

for detector pixel area A, DC responsivity R, and voltage noise spectral density $S_V(f)$ (units of $V^2\,Hz^{-1}$). R is chosen as the DC responsivity (as opposed to its frequency-dependent value) for consistency with noise-equivalent temperature difference measurement protocols.

Using this form, the limiting detectivities $$D^*_{1/f}(f) = \frac{\eta\alpha\tau}{c_A}\sqrt{\frac{h_{VOx}}{K}}f^{1/2}$$

$$D^*_{Johnson}(f) = \eta\alpha\left(\frac{\tau}{4k_B c_A}\left(1-\frac{T_0}{T_{VOx}}\right)\right)^{1/2}$$

$$D^*_{therm}(f) = \frac{\eta}{T_{VOx}}\left(\frac{\tau}{4k_B c_A}\right)^{1/2}$$

are derived for 1/f, Johnson noise, and thermal fluctuation noise, respectively. Here, η is the absorption efficiency of incident light of the pixel, α is the thermal coefficient of resistance of the $VO_x$ material, $c_A$ is the heat capacity per area of the pixel, K is the 1/f noise constant of the material, $h_{VOx}$ is the thickness of the $VO_x$ layer within the pixel, $k_B$ is Boltzmann's constant, τ is the thermal time constant, $T_{VOx}$ is the operating temperature of the $VO_x$ pixel, and $T_0$ is the ambient temperature of the sensor.

In deriving these expressions, we assume that the measured signal is read out constantly with the pixel while under a steady current bias, and that no other electrical power is injected into the pixel. These equations feature no explicit dependence on detector area and at most depend on the pixel layer structure, with the exception of τ insofar as maintaining a constant τ while scaling the pixel area involves scaling the total thermal conductivity from the pixel G proportionally. While the 1/f noise-limited detectivity scales with τ, the Johnson and thermal fluctuation-limited detectivities scale as √τ, leading to the counter-intuitive result that 1/f noise is not as severe in slow devices as one might expect. Physically, this is related to the fact that slower devices exhibit better thermal isolation, therefore require less bias to maintain operating temperature, and thus have less absolute 1/f noise (proportional to bias current).

Since D*(f) is a frequency-dependent quantity, there is some subtlety in selecting a single frequency-independent D* for a detector pixel which captures the overall performance of the pixel and permits meaningful comparison, especially between pixels with widely varying τ. Again, we take inspiration from thermal camera NEDT measurement protocols in which, for instance, 128 consecutive frames are captured while imaging a constant blackbody source, and the RMS noise voltage across frames is evaluated for each pixel. In the frequency domain, this is equivalent to integrating the noise power spectral density between a lower frequency $f_1 \propto 1/t_{meas}$, where $t_{meas}$ is the overall duration of the acquisition, and $f_2=f_r/2$ is equal to the Nyquist frequency of the readout. For most state of the art of $VO_x$ bolometers, $f_r/2 \approx \tau^{-1}/2\pi$. We therefore define the frequency-independent but τ-dependent D* as:

$$D^* = R\sqrt{A(f_2-f_1)}(\int_{f_1}^{f_2}S_V(f)df)^{-1/2} = \sqrt{(f_2-f_1)}[\int_{f_1}^{f_2}\Sigma_{noise\,source}(D^*(f))^{-2}df]^{-1/2}$$

where the sum Σ denotes summation over any of the single-noise-source-limited D*(f) given in equations above one may wish to take into account in calculating the overall D*, $f_1=0.147\,t_{meas}^{-1}$, where the coefficient has been calculated to accurately represent the RMS 1/f noise, and $f_2=\tau^{-1}/2\pi$.

FIG. 13 shows the detectivity D* versus thermal time constant τ for various individual and combined noise sources alongside specific device data points estimated from reported NEDT values using representative values for $c_A$, α, K, and $h_{VOx}$ from Niklaus et al., "Uncooled infrared bolometer arrays operating in a low to medium vacuum atmosphere: performance model and tradeoffs," in Infrared Technology and Applications XXXIII (eds. Andresen, B. F., Fulop, G. F. & Norton, P. R.) (SPIE, 2007). doi:10.1117/12.719163. The operating temperature was taken to be $T_{VOx}$=70° C., which is near the $VO_x$ phase transition point. The black vertical line in FIG. 13 represents the maximum τ achievable for the assumed $c_A$ in which all parasitic thermal conductivity away from the device is eliminated, leaving only radiative thermal fluctuation.

FIG. 13 shows that electrical noise reduces the potentially achievable detectivity of $VO_x$ bolometers, compared to unavoidable thermal fluctuation noise, by a factor of two to three. Indeed, manufacturers have little incentive to reduce thermal fluctuation noise (by designing more thermally insulating supports and lower heat capacity pixels) since 1/f noise dominates in $VO_x$ bolometers. Besides, using thinner pixels would eventually also require reducing $h_{VOx}$ exacerbating 1/f noise. These considerations prompt us to investigate alternative temperature readout approaches for next-generation bolometer technology.

Optical readout is an enticing alternative to electrical readout of bolometer temperature. In an optically interrogated bolometer, the device response may be enhanced considerably using optical resonators. These resonators eliminate the need to use materials with highly temperature-dependent material properties in the temperature-sensing elements (pixels). Instead, the readout mechanism can be implemented with ordinary dielectrics. These optical sensors can be biased at room temperature, do not exhibit electrical 1/f noise, and can be optically tuned to avoid the excess thermal leakage and heat capacity associated with control electrodes. Additionally, if fabricated with sufficient repeatability, there would be no need to electrically contact the pixels to thermally tune the pixels' resonant wavelengths to the desired values.

The lack of flicker noise promises to allow optical bolometers to reach thermal fluctuation noise-limited performance, indicated as an area of opportunity for optical bolometry in FIG. 13. The ambiguous upper limit for thermal fluctuation noise-limited performance reflects uncertainty in the minimum value of $c_A$ for optical bolometer pixels, which has the potential to be lower than $c_A$ for $VO_x$ bolometer pixels.

SUMMARY

The resonant microcavity bolometers disclosed here overcome the limitations of existing technologies to potentially surpass the detectivity of $VO_x$ without sacrificing response time thanks to several advances. First, a wavelength-scale microcavity, such as a photonic crystal cavity or micro-disk, is used as the optical resonator and thermal readout mechanism. These wavelength-scale microcavities offer near-diffraction-limited confinement of the readout light, adding negligible thermal mass to the pixel while providing quality factors in excess of 100,000 and thermal fluctuation-limited detectivity. New processes and fabrication techniques enable the incorporation of engineered, resonant absorbers on each pixel. Finally, each pixel—including both the absorbers and readout cavity—can be thermally isolated from the environment using non-electrically conductive supports. Combined, these advances surmount the challenges associated with previous designs to enable thermal fluctuation-limited bolometry without significantly increasing the pixel thermal mass, pixel-to-bulk thermal conductance or pixel pitch compared to $VO_x$ technology.

In addition, an inventive thermal sensor may have lower system size, weight, and power (SWaP) than other bolometers thanks to advances in integrated photonics. Instead of probing the cavity resonance shift with a normally incident infrared beam, the thermal sensor may incorporate waveguides that couple light evanescently to and from resonators that are in the same plane as the waveguides. Lateral evanescent coupling allows the optical manipulations to be done on a single chip, reducing system cost and complexity considerably.

An inventive device for imaging thermal infrared radiation can include an array of pixels, a light source, and a detector array. Each pixel in the array of pixels comprising an absorbing material to absorb incident thermal infrared radiation and a photonic crystal cavity in thermal communication with the absorbing material. Absorption of the incident thermal infrared radiation by the absorbing material causes a shift in a resonance of the photonic crystal cavity that is probed with probe light from the light source. (The resonance of each photonic crystal cavity can have a center wavelength of between about 1450 nm and about 1650 nm.) The detector array detects the probe light scattered by the photonic crystal cavities.

The absorbing material can include one or more pyrolytic carbon pillars, each having a diameter of about 2 μm to about 3 μm and a height of about 3 μm to about 10 μm. The absorbing material can absorb incident thermal infrared radiation in the mid-infrared radiation (IR) and/or long-wave infrared (LWIR) bands. As understood by those of skill in the art, the mid-IR band spans 3-8 μm and the LWIR band spans 8-15 μm.

An inventive device may also include a substrate and hollow pillars that extend from the substrate. These hollow pillars support the array of pixels above the substrate and thermally isolate the array of pixels from the substrate. Each hollow pillar can have a diameter of about 1.0 μm to about 1.5 μm, a height of about 1.5 μm to about 2.5 μm, and a thickness of about 20 nm to about 40 nm. The substrate can be coated with at least one of an indium tin oxide layer or an anti-reflection coating. The hollow pillars can support the array of pixels above the substrate by a distance of about $\lambda_{LWIR}/4$, where $\lambda_{LWIR}$ is a median wavelength of the incident thermal infrared radiation.

An inventive device can also include a metasurface in optical communication with the array of pixels, the light source, and the detector array. In operation, the metasurface directs the probe light from the light source to the array of pixels. It also directs the probe light scattered by the photonic crystal cavities to the detector array. Or the inventive device can include a waveguide in optical communication with the light source and evanescently coupled to the array of pixels. In operation, the waveguide guides the probe light from the light source and evanescently couple the probe light to the photonic crystal cavities in the array of pixels.

An inventive device can be made by forming a photonic crystal cavity in a first substrate and forming an absorber on the first substrate in thermal communication with the photonic crystal cavity. A stamp comprising the photonic crystal cavity and the absorber can be separated from the first substrate, then disposed on supports extending from a second substrate. The supports thermally isolate the stamp from the second substrate.

The absorber can be formed on the first substrate by forming a pillar made of polymer on the first substrate, then pyrolyzing the pillar. The pillar can be formed about 7 μm to about 10 μm from the photonic crystal cavity. After pyrolyzing, the pillar can have a diameter of about 2 μm to about 3 μm and a height of about 3 μm to about 10 μm.

The supports can be made by forming a polymer mold on the second substrate, then disposing an oxide layer (e.g., $ZrO_2$, $SiO_2$, $HfO_2$, and WOx) on the polymer mold. A hole is formed in the oxide layer, then the polymer mold is removed from under the oxide layer to yield a support that is a hollow shell or pillar. Each support can have a diameter of about 1.0 µm to about 1.5 µm, a height of about 1.5 µm to about 2.5 µm, and a thickness of about 20 nm to about 40 nm. If desired, the second substrate can be coated an indium tin oxide layer or an anti-reflection coating to improve device performance.

An inventive device for imaging thermal infrared radiation may include an array of pixels, where incident thermal radiation heats a resonator, such as a micro-disk, in each pixel. This heating produces a resonance shift due to the thermo-optic effect, which is read out by a waveguide evanescently coupled to the resonator. An optical probe signal which is coupled to the resonator can be interfered with a local oscillator reference signal and read out with one or two photodetectors (either on one or both output arms of the interferometer) in order to read out the phase imposed upon the probe signal by the resonator, so as to infer the resonance shift. Alternatively, the change in amplitude of the optical probe signal coupled to the resonator can be read out directly with a photodetector so as to infer the resonance shift.

The resonator may be a photonic crystal cavity resonator instead of a micro-disk resonator. In this case, there may be a dielectric or photonic crystal waveguide in the plane of the photonic crystal cavity resonator that is evanescently coupled to the photonic crystal cavity resonator. Alternatively, instead of in-plane coupling between a waveguide and the photonic crystal cavity resonator, the photonic crystal cavity resonator may be probed with light incident from out of the plane of the cavity. The interference between the light scattered by the photonic crystal cavity resonator and an optional reference beam can be carried out using a free-space optical element such as a beam splitter. In such a case, the device may include a side- or edge-lit metasurface structure that illuminates the photonic crystal cavity resonator with the probe light and interferes the scattered light with the reference beam onto a photodetector array.

The resonator can be constructed from a variety of materials, including silicon, GaAs, AlN, SiN, or electro-optic material, such as $LiNbO_3$, and probed at a variety of resonant wavelengths, including visible, near-infrared, and telecommunications (e.g., 1450-1650 nm) wavelengths. The resonator's resonant wavelength can be fine-tuned by heating the resonator with a pair of wires connected to a heating element integrated on or with resonator or by heating the resonator with light at a different wavelength than that of the resonance addressed by the probe optical signal.

The resonator's resonant wavelength can also be adjusted or fine-tuned by engineering a low spring constant mechanical degree of freedom in the resonator, such that an applied voltage across an engineered electric field path in the structure induces an electrostatic force that causes the resonator to shift or distort, giving rise to a change in resonance. In other words, the resonator can be a MEMS device whose resonance can be changed by electromechanically actuation. The MEMS device can be displaced with a direct electrical connection between the thermally sensitive element and the bulk. Alternatively, capacitive coupling between the sensitive element and wires in the bulk of the chip could provide a pathway for electric fields and thus for resonance tuning.

If the resonator is made of an electro-optic material, its resonant wavelength can be shifted by applying a voltage across the electro-optic structure. The electro-optic structure can be tuned with a direct electrical connection between the thermal sensitive element and the bulk. Capacitive coupling between the sensitive element and wires in the bulk of the chip can provide an alternative pathway for electric field-induced resonant trimming.

The resonator's resonance wavelength can also be tuned using the piezo-electric effect. For example, the resonator may be made of electro-optic material and have a low spring constant mechanical degree of freedom in the resonator such that an applied voltage across an engineered electric field path in the structure induces an electrostatic force which causes the index of the electro-optic material to shift due to the piezo-optical effect, giving rise to a change in resonance. This can be accomplished with a direct electrical connection between the thermal sensitive element and the bulk or capacitive coupling between the sensitive element and wires in the bulk of the chip.

The resonator may be coated with or include a material that readily absorbs the incident thermal radiation, such as pyrolytic carbon pillars like those described below, a "forest" of vertically aligned carbon nanotubes (CNTs), a layer of nanostructured "black gold," a ceramic layer, or a polymer layer.

The thermally sensitive element of each pixel can be suspended or supported using thin tethers or a spring-like structure constructed from a bulk material, such as a semiconductor or ceramic. In the case of a micro-disk or micro-ring resonator, the tethers may be connected to the underside of the resonator so as not to disturb the optical mode that circulates along the outside of the resonator. In this case, the cross-sectional length scale of the tethers can be in the tens of nanometers. For instance, the thermally sensitive element can be suspended using ceramic tethers of a thickness of around 10 nm or less, constructed using an atomic layer deposition process. One specific implementation of this concept may involve using atomic layer deposition (ALD) to coat a tether and/or a gap between two tethers prior to removal of the tethers and undercutting of the resonator and supports to leave behind thin ALD tethers with a "U" or "Π" cross-section, which would be more stiff than flat tethers. The element may also be supported upon bump- or pillar-shaped hollow shells consisting of a thin (e.g., tens of nanometers) layer of a low thermal conductivity ceramic material such as zirconia. The thermally sensitive element can also be suspended from the bulk using strips of a two-dimensional (2D) material, such as graphene.

All combinations of the foregoing concepts and additional concepts discussed in greater detail below (provided such concepts are not mutually inconsistent) are contemplated as being part of the inventive subject matter disclosed herein. All combinations of claimed subject matter appearing at the end of this disclosure are contemplated as being part of the inventive subject matter disclosed herein. Terminology explicitly employed herein that also may appear in any disclosure incorporated by reference should be accorded a meaning most consistent with the concepts disclosed herein.

Other systems, processes, and features will become apparent to those skilled in the art upon examination of the following drawings and detailed description. It is intended that all such additional systems, processes, and features be included within this description, be within the scope of the present invention, and be protected by the accompanying claims.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 1 shows a summary of an optical bolometer for thermal imaging. Arrows represent design dependencies, whereby the design details of one aspect of the system may influence another. Dotted lines connect design aspects which are related but not necessarily interdependent.

FIG. 2 illustrates a routing approach for an optical bolometer thermal imager with row/column addressing, with wavelength-scale microcavity resonators that are released and suspended from the bulk material and waveguides in the bulk material and evanescently coupled to the resonators.

FIG. 3 is a schematic illustration of a single sensor element based on a ring resonator.

Figure 4:
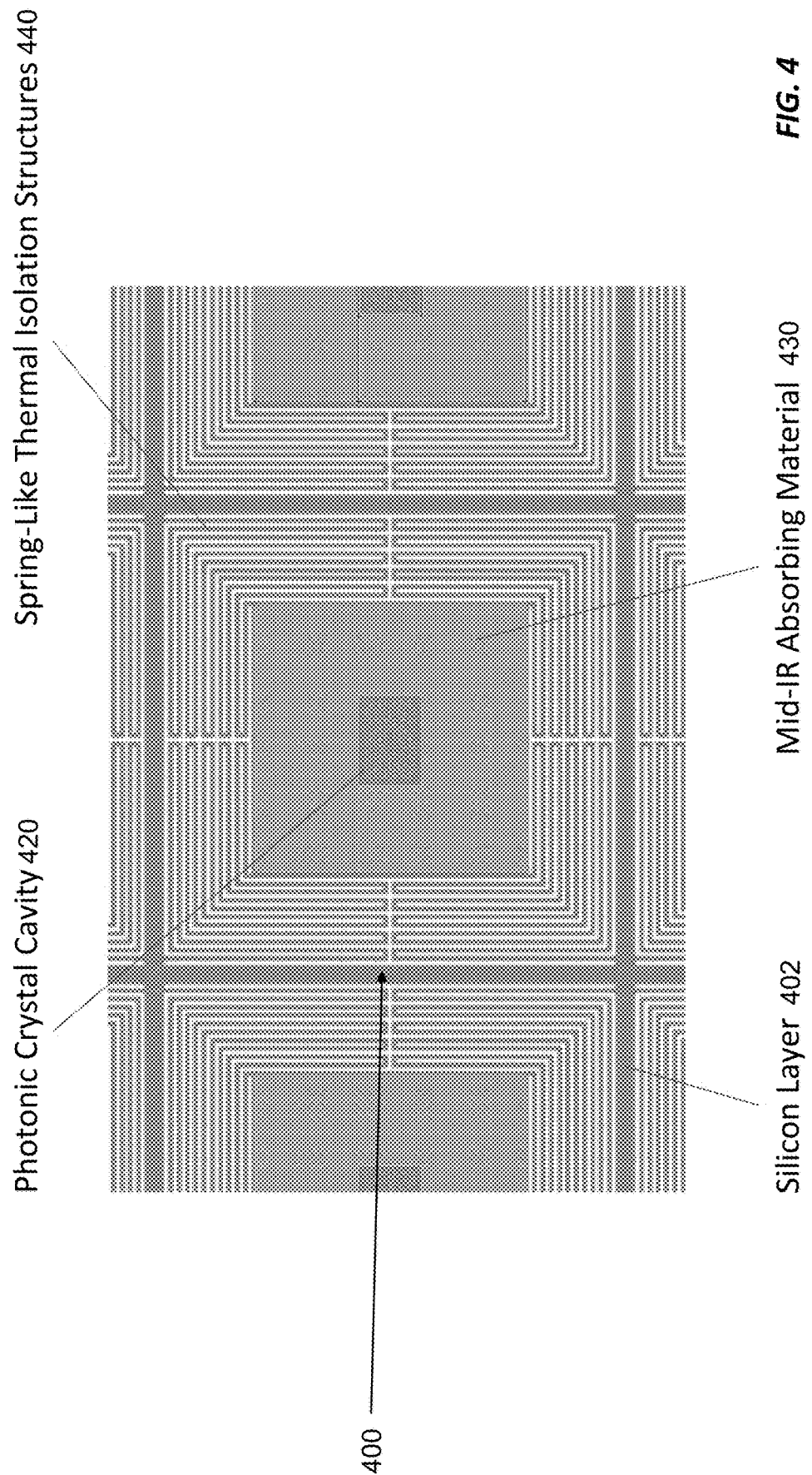

FIG. 4 shows photonic-crystal microcavity pixels in an optical bolometer that are probed with out-of-plane incident light. The pixels are formed in a layer of silicon, or some other optical material, selectively coated with a mid-IR absorbing material, such as vertically oriented carbon nanotubes or nanostructured black gold. In the middle of each pixel is a photonic crystal cavity represented as an array of holes. Spring-like structures thermally isolate each pixel from the bulk and from the other pixels. (Not to scale—springs widened to show detail.)

Figure 5B:
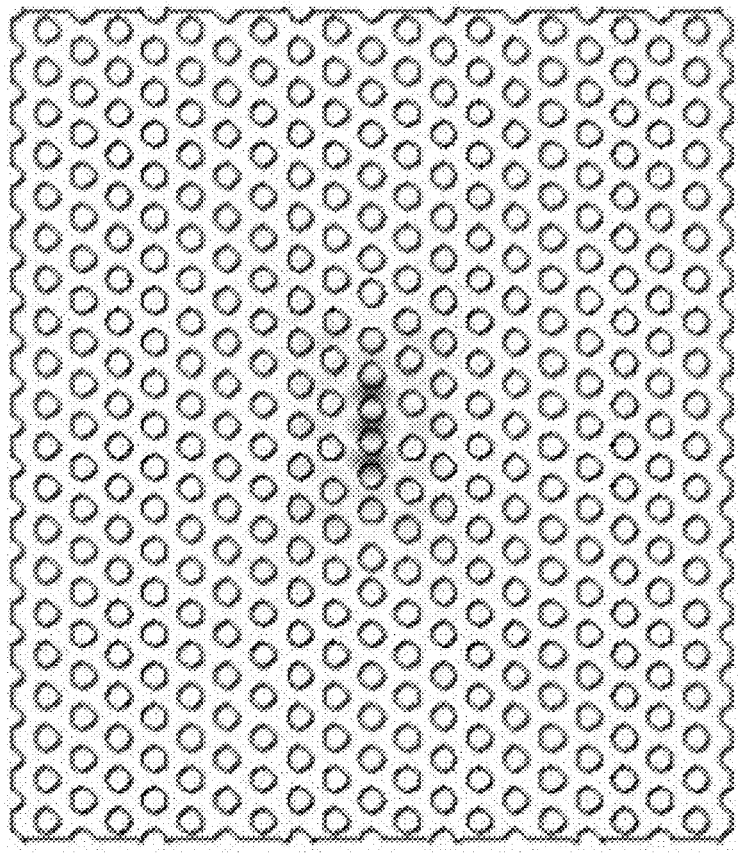
Figure 5A:
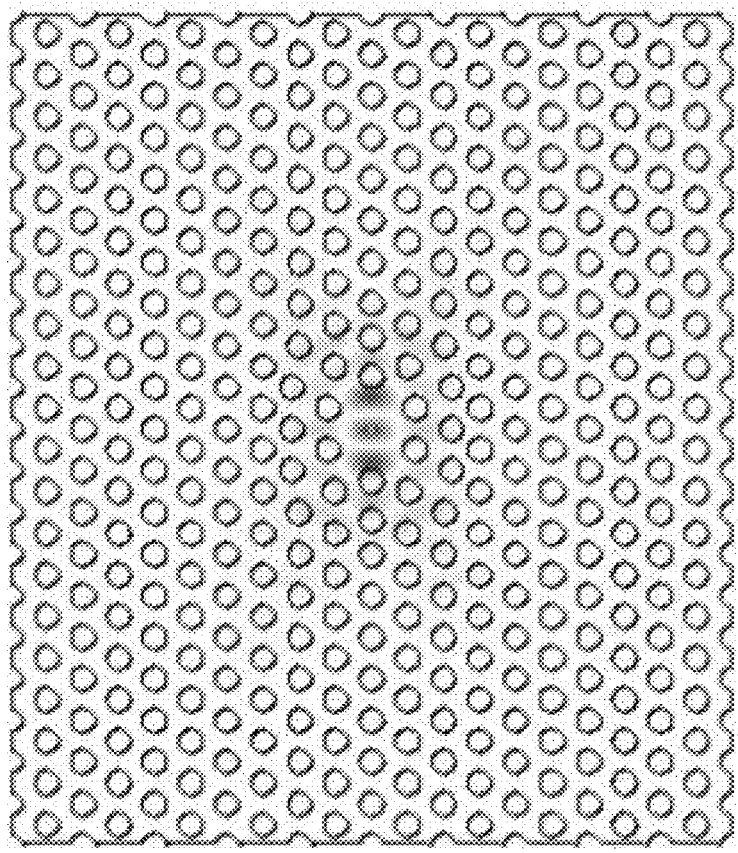

FIG. 5A shows an L3 cavity suitable for use as the photonic crystal cavity in the systems of FIG. 4.

FIG. 5B shows an L4/3 cavity suitable for use as the photonic crystal cavity in the systems of FIG. 4.

Figure 6A:
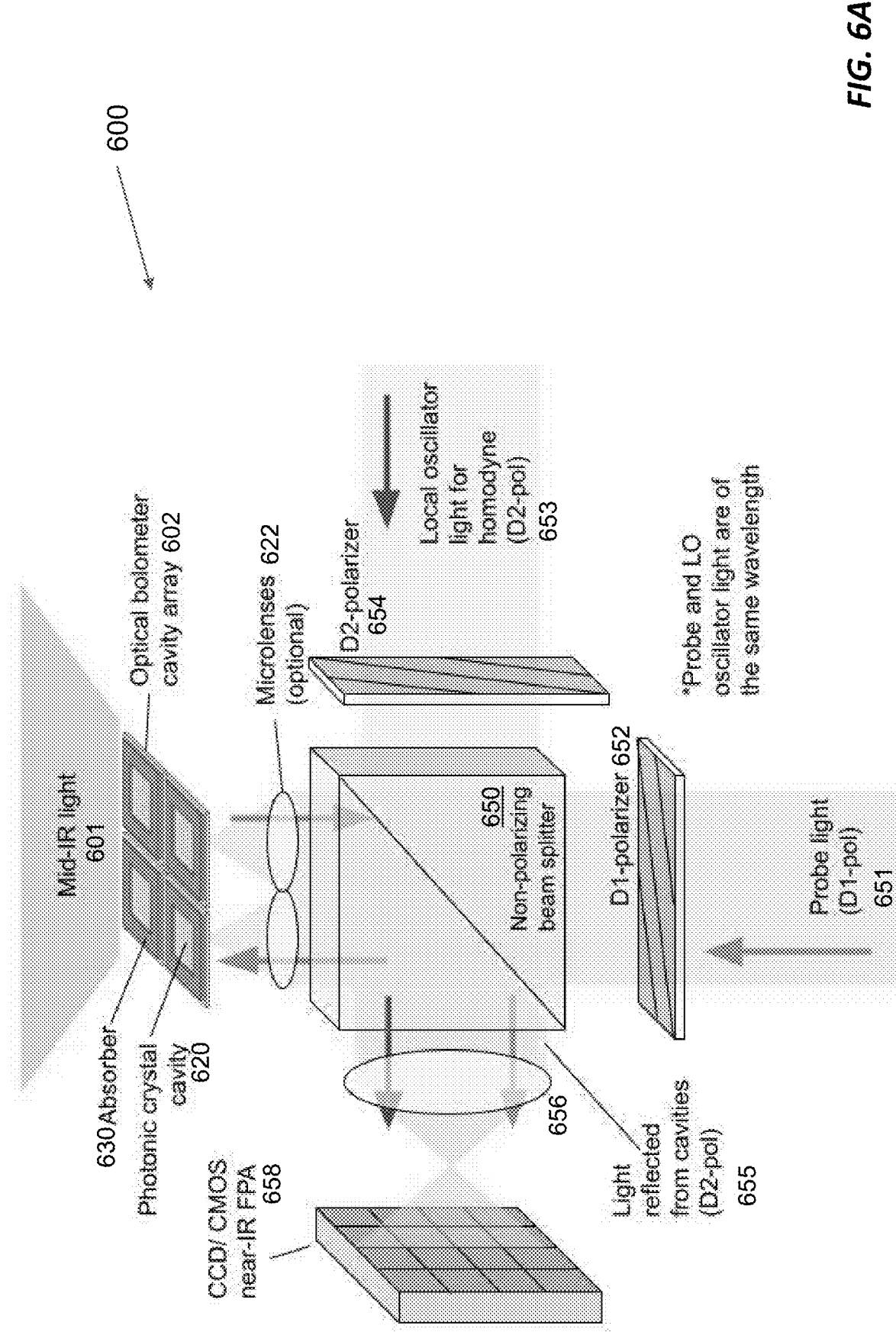

FIG. 6A illustrates off-angle readout of a photonic-crystal bolometer array using a metasurface. A chiral metasurface accepts side illumination, scattering one diagonal polarization up towards the photonic crystal cavities and one down towards the FPA, which then interferes with light scattered from the photonic crystal cavities.

Figure 6B:
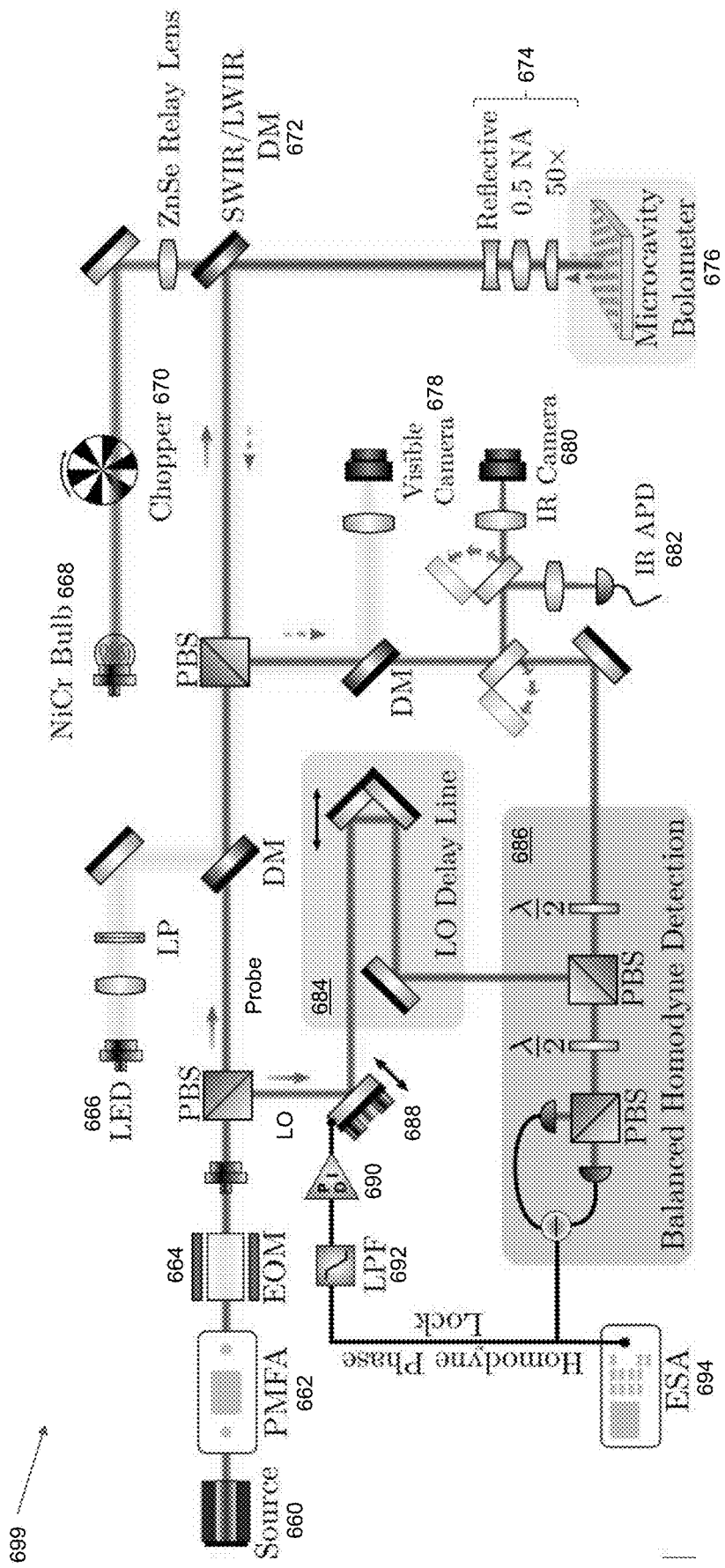

FIG. 6B illustrates readout of a photonic-crystal bolometer array using probe beams fed in via waveguides that couple evanescently to the photonic crystal cavities.

FIG. 7A illustrates one approach for reading out the optical bolometer out-of-plane coupling. A beam splitter interferes an optical local oscillator (LO) beam with a probe beam reflected from the microcavities and directs the interfered beams to a near-infrared (NIR) focal plane array (FPA), which performs a homodyne measurement. Wire grid polarizers prevent the probe and LO beams from reflecting back toward the laser source.

FIG. 7B shows a measurement setup used to characterize the resonant bolometer pixels. The resonance shift produced from changes in scene temperature—emulated here by chopping the emission of a nickel chromium (NiCr) bulb onto the bolometer—can be read out via direct detection on a photodetector or camera, or alternatively via shot-noise-limited balanced homodyne detection.

Figure 8D:
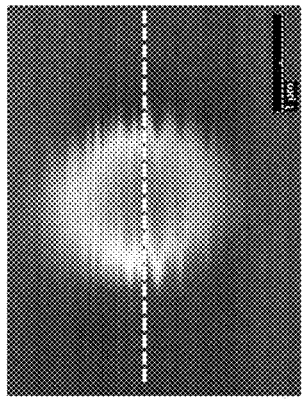
Figure 8B:
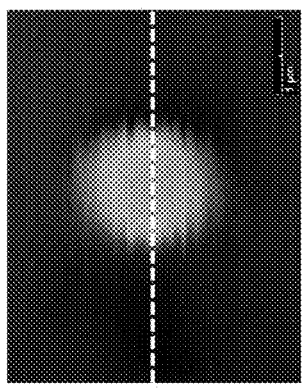
Figure 8E:
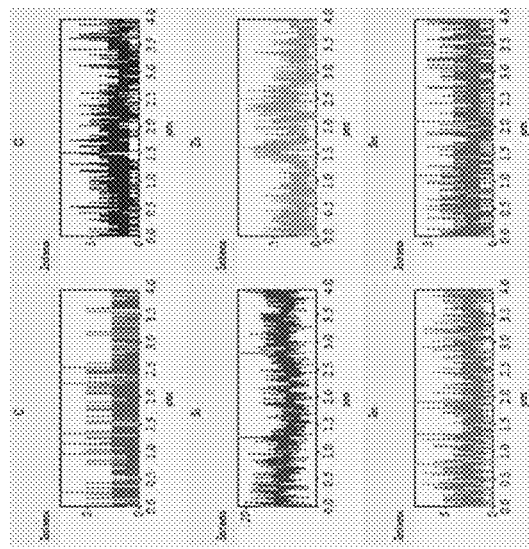
Figure 8C:
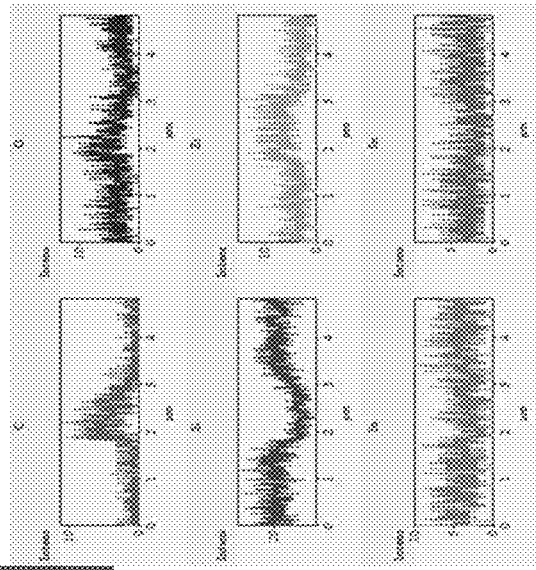
Figure 8A:
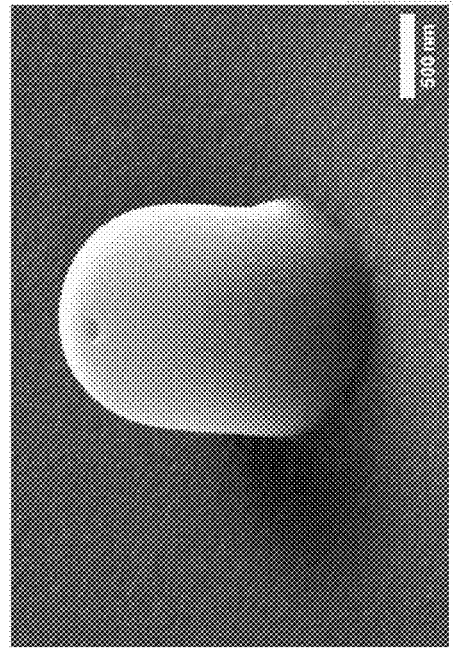

FIG. 8A shows a scanning electron micrograph (SEM) of a hollowed-out zirconia shell structure for supporting bolometer pixels with low thermal conductivity to the substrate.

FIG. 8B shows an image taken in an energy dispersive X-ray spectroscopy (EDS)-SEM of a hollowed-out zirconia shell support structure with no FIB hole that was subjected to oxygen plasma.

FIG. 8C shows EDS line scans across the horizontal line in FIG. 8B, demonstrating the organic mold of the bolometer support was not removed.

FIG. 8D shows an image taken in an EDS-SEM of such a structure with a focused ion beam (FIB) hole that was subjected to oxygen plasma.

FIG. 8E shows EDS line scans across the horizontal line in FIG. 8D, showing effective removal of the original organic mold as indicated by the constant, weak carbon signal across the linescan.

Figures 9A, 9B:
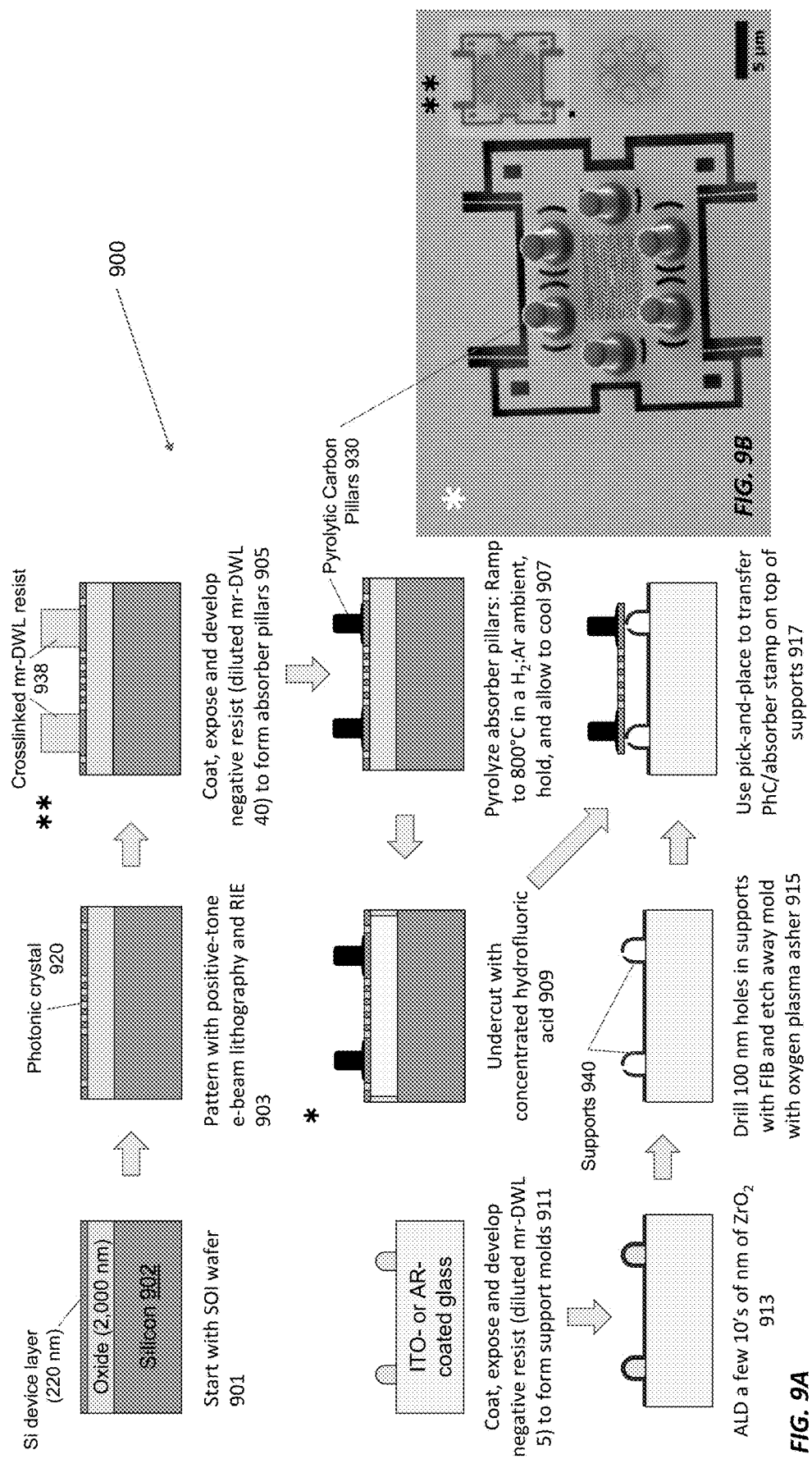
Figure 12:
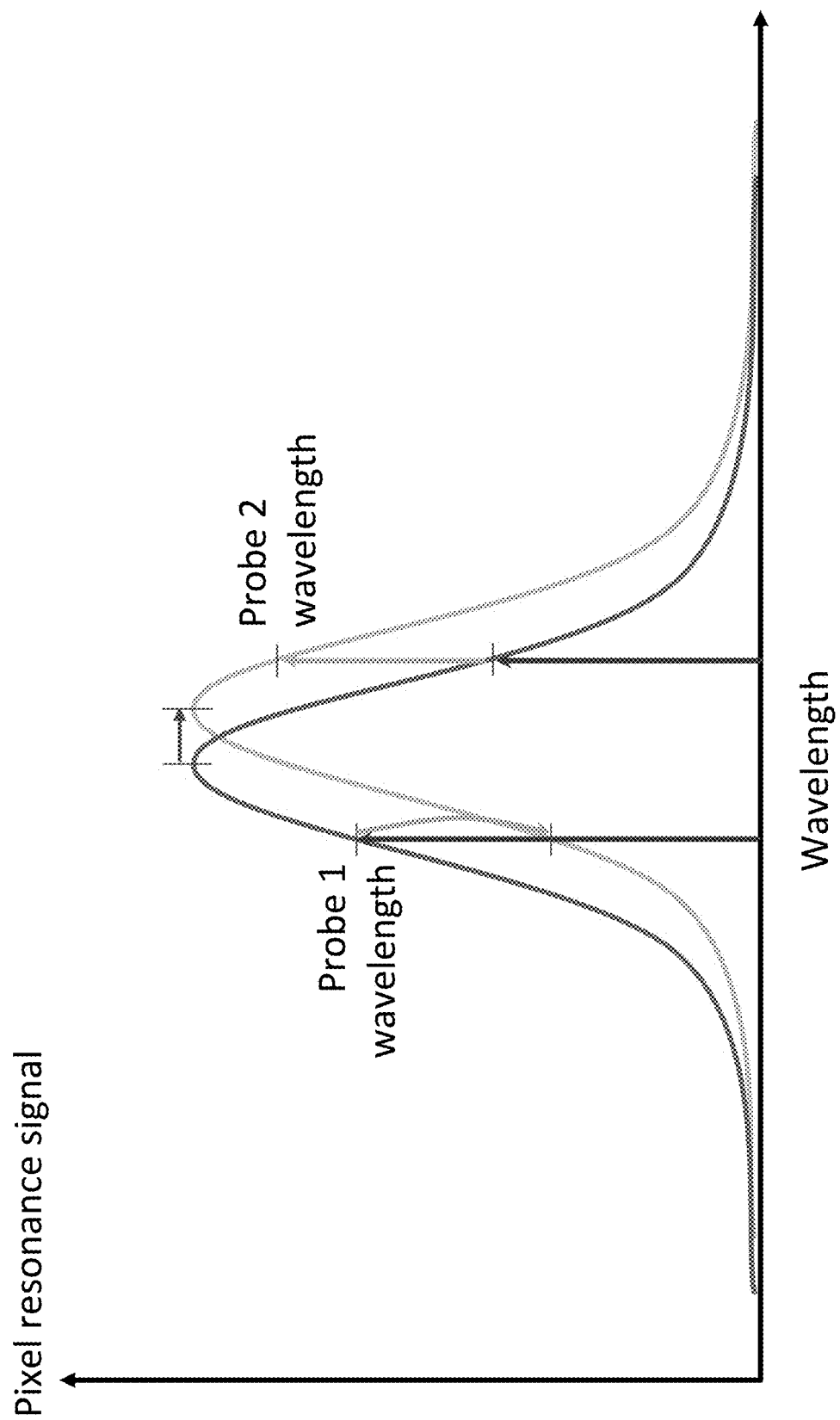

FIG. 9A shows a process flow for fabrication of the transferred stamp shown in FIG. 12.

Figure 10B:
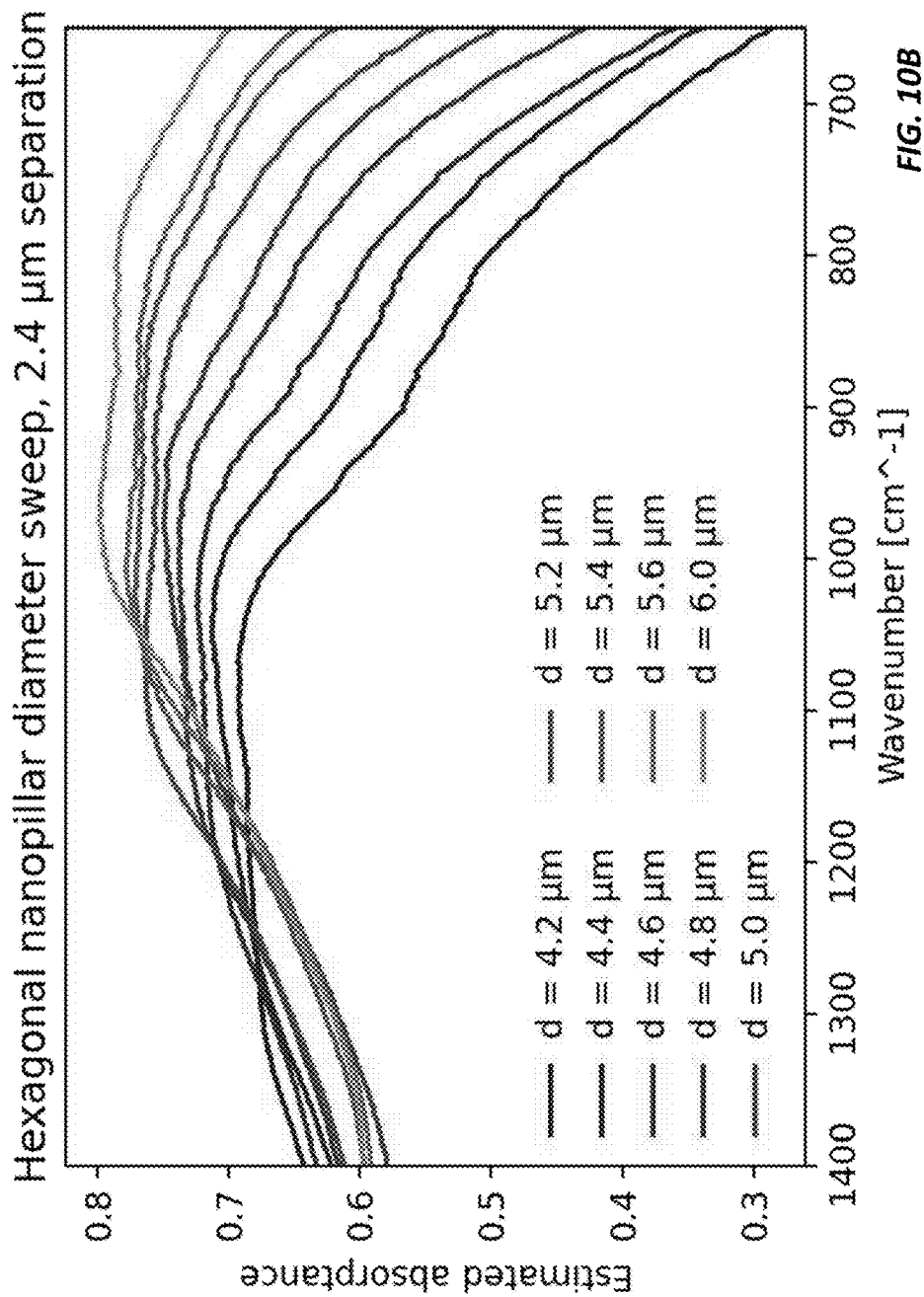

FIG. 9B shows an SEM image of the stamp device after incorporation of absorbers and undercutting, but prior to transfer to the hollow zirconia supports. The insets of FIG. 10B show optical images (at two different focal planes) of the stamp after lithography of the negative resist absorber pillars, but prior to pyrolyzation. Asterisks in FIG. 9B link to pictures of the device to steps of the process flow in FIG. 9A.

Figure 9C:
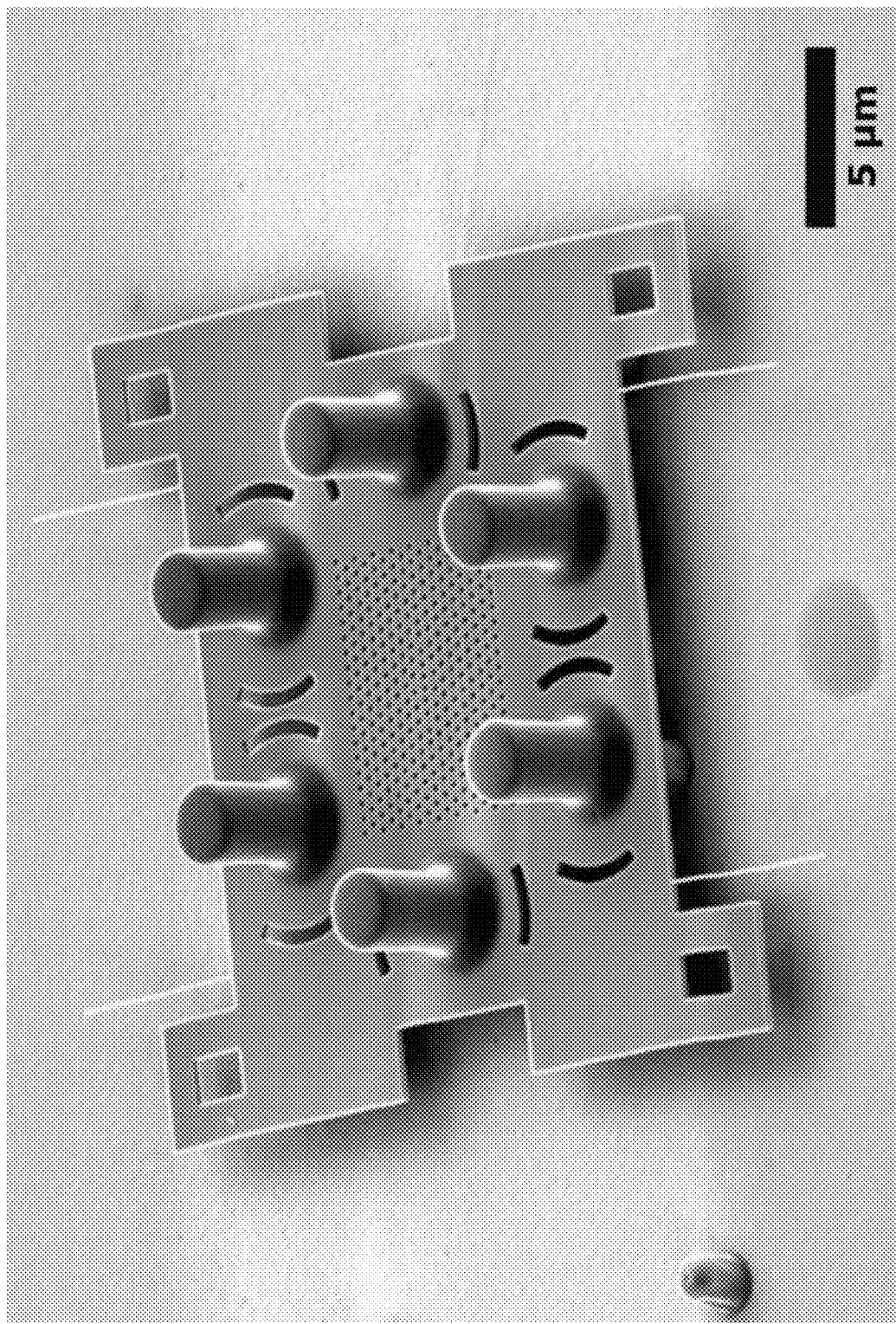

FIG. 9C shows a bolometer pixel stamp for out-of-plane readout incorporating a photonic crystal cavity, six mid-IR absorber pillars, and transferred via tungsten probe pick-and-place onto a set of four hollow zirconia shell supports.

Figure 10A:
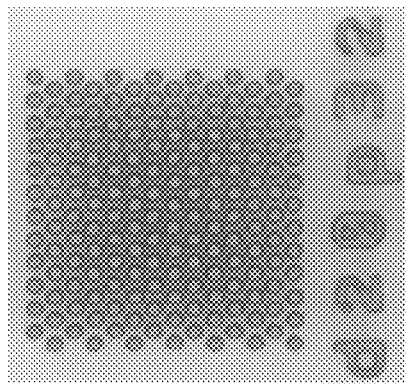

FIG. 10A shows an example of a hexagonal array of pyrolytic carbon long-wave infrared absorbers.

FIG. 10B shows absorptance spectra (post-processed from Fourier-transform IR (FTIR) reflection and transmission measurements) for hexagonal arrays of pyrolytic carbon pillars of various pre-pyrolyzation pillar diameters with a pre-pyrolyzation pillar-to-pillar separation of 2400 nm. The pillars shrink by approximately a half during pyrolyzation, so the actual post-pyrolyzation pillar diameters are smaller.

Figures 11A, 11B:
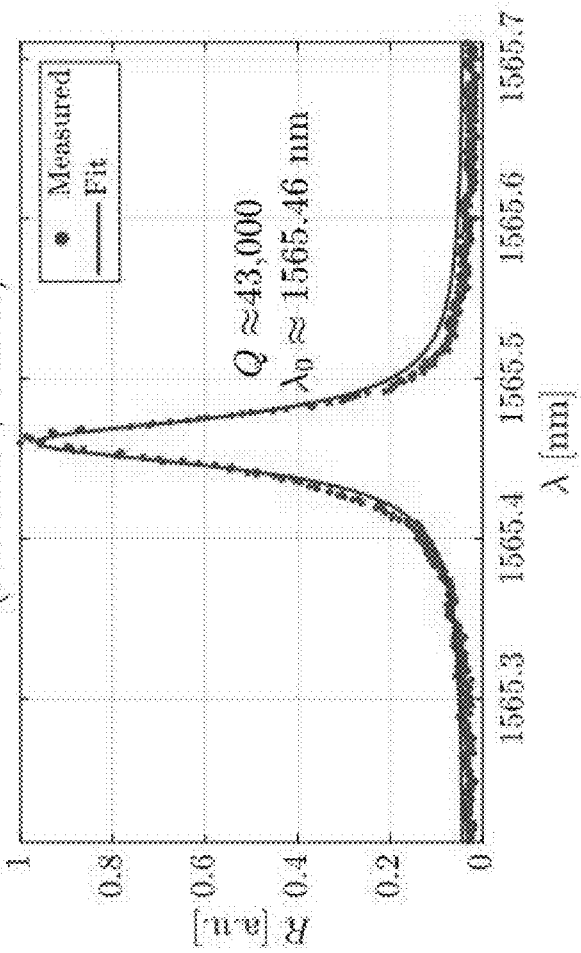

FIGS. 11A and 11B show cross-polarized reflectance versus wavenumber scans of two different L3 cavities after the addition of pyrolytic carbon absorbers followed by a light oxygen plasma application, demonstrating resilience of the quality factor to the pyrolyzation process.

FIG. 12 shows a plot of pixel resonance signal versus wavelength depicting the two-probe readout mechanism, which can reduce the impact of thermal effects arising from heating of the pixel via probe light through a reduction in the absorbed light at one probe wavelength that is counteracted by an increase from the other probe wavelength upon thermal shifting of the pixel resonance.

Figure 13:
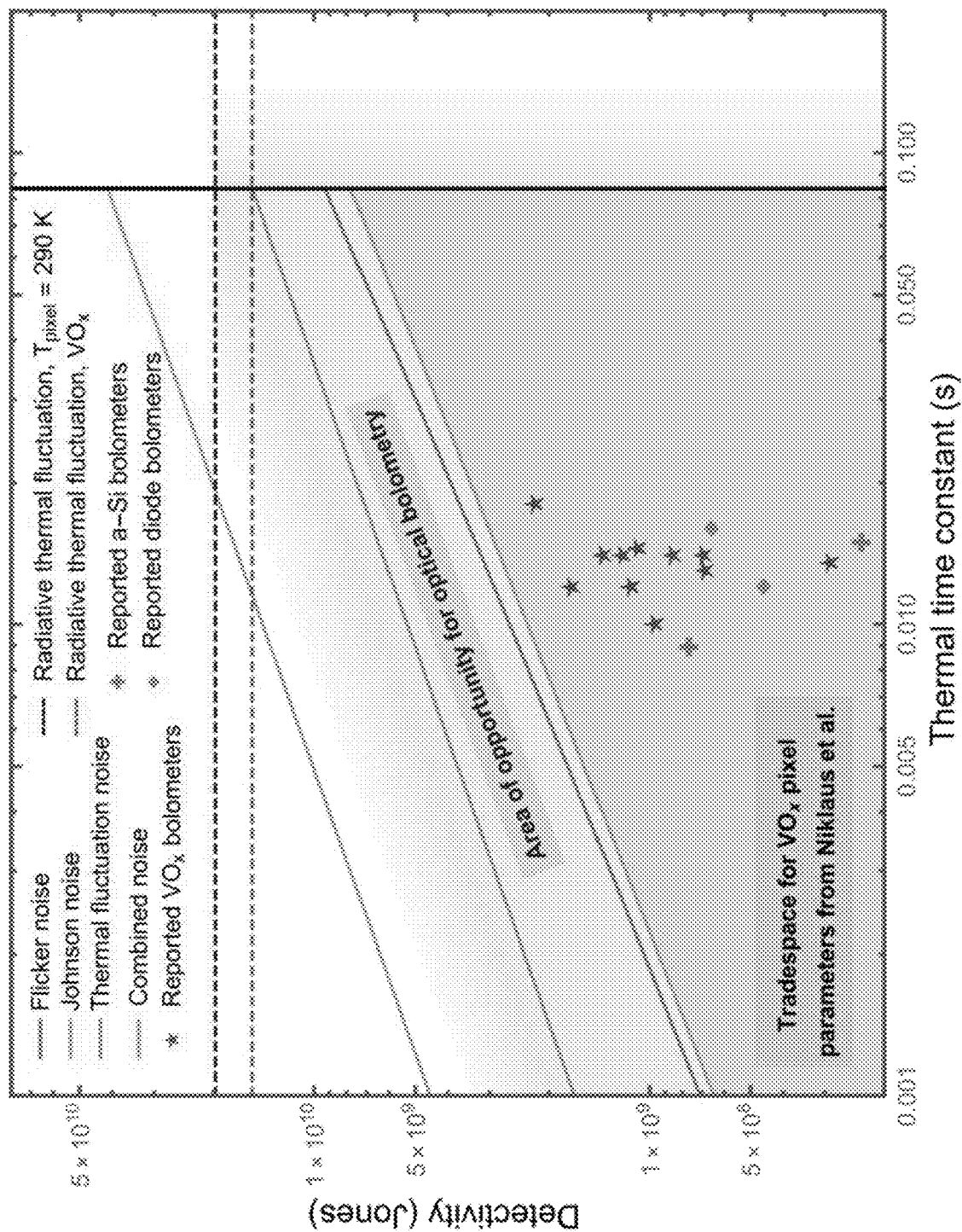

FIG. 13 shows a tradespace plot outlining the thermal time constant and detectivity performance range for $VO_x$ bolometers, specific data points for demonstrated devices, and the area of opportunity for optical bolometry to improve upon the state of the art, based on an analysis of the predominant noise sources in $VO_x$ devices.

DETAILED DESCRIPTION

Figure 1:
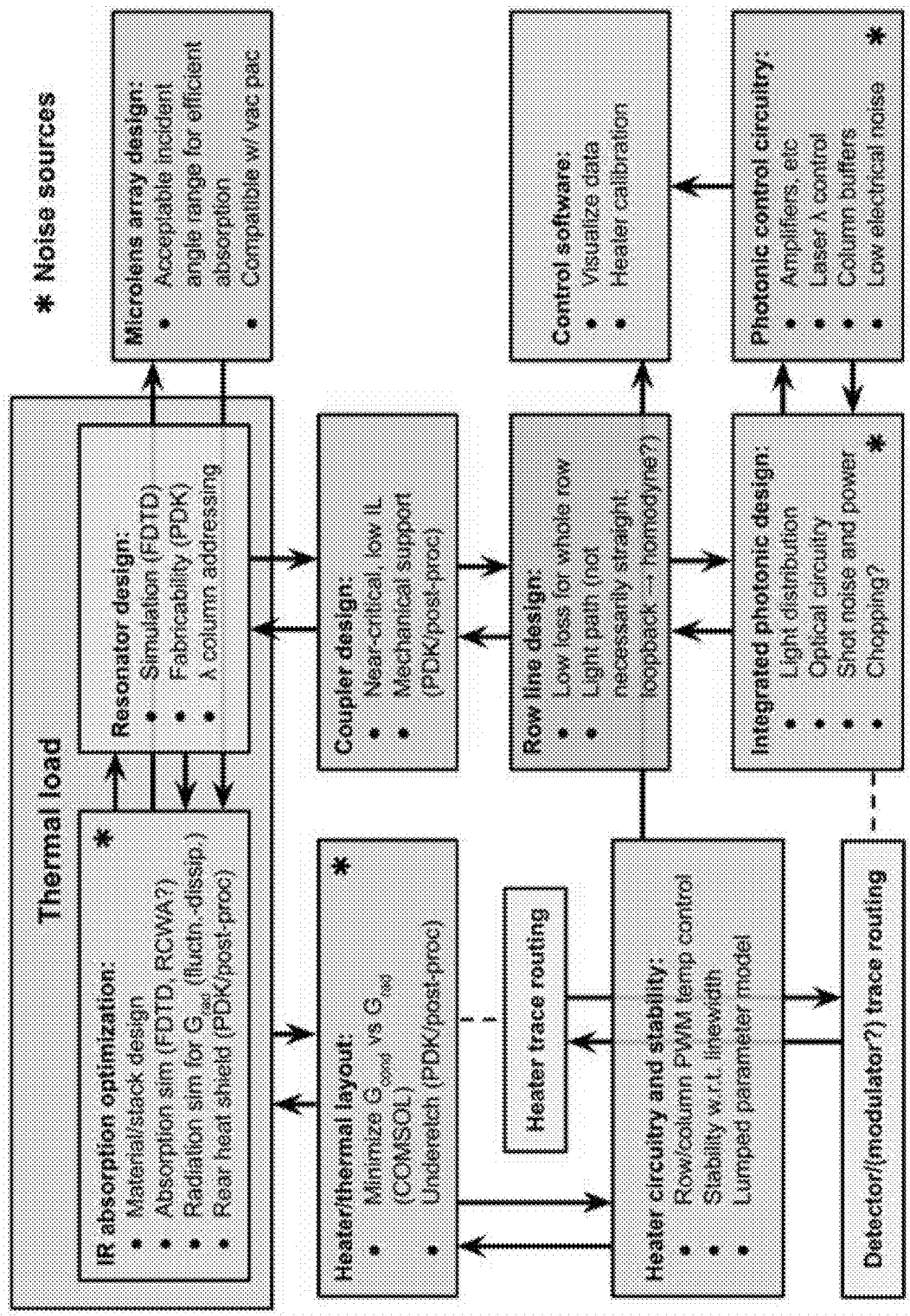

FIG. 1 shows the different components of an optical bolometer thermal imaging system and their design interdependencies. In some of the designs disclosed here, rows of sensors (pixel) in an array are coupled to a shared row-line waveguide carrying probe light. Each photonic-crystal, ring, or disk microcavity in the row is tuned to or resonant with a different probe wavelength. The microcavities' resonance wavelengths can be fine-tuned via integrated heaters or external optical control, each of which shifts the resonance of a particular ring or microcavity. Thus, as the probe light steps or scans in wavelength, the resonators in a row are addressed sequentially, yielding a wavelength-division multiplexing (WDM) approach to the sensor readout. This sequential approach reduces the input/output (I/O) bandwidth of the array, allowing the number of I/O pins to scale with the number of rows of the array.

Similarly, the thermal tuning of each resonator using a heater may also follow a time-multiplexed row/column addressing approach. The heater switching frequency seen by each sensor element should be far beyond its thermal 3-dB low pass frequency so that the heating power fluctuations due to time-multiplexed thermal tuning do not cause measurable temperature fluctuations in the sensor.

As noted above, the microcavities can be made with different resonant frequencies. These resonant frequencies can be set, for example, by picking the radii of the microcavities to be different. If the fabrication error in the cavity resonance frequencies is much less than the resonance widths, then having individual tuning for each cavity would be unnecessary.

A Micro-Ring/Disk Resonator Optical Bolometer Thermal Imaging System

FIG. 2 shows an optical bolometer 200 that includes a two-dimensional array of sensors 220, each of which includes a ring- or disk-shaped microcavity at least partially coated with LWIR-absorbing material and fabricated in a semiconductor substrate 202. Each sensor 220 acts as a separate bolometer pixel in a focal plane array and has a microcavity resonance wavelength that can be (optionally) tuned using a corresponding optional heater 230. The heaters 230 are electrically coupled to row leads 232 and column leads 234. The sensors 220 are evanescently coupled to row waveguides 214 fabricated in the substrate 202. The row waveguides 214 are coupled in turn to a light source 204, such as a tunable laser, and integrated detectors 216 via directional couplers 212 and a column waveguide 210.

In operation, the row waveguides 214 guide incoming laser light from the laser 204 into a sequence of M/2 row-pairs of sensors 220, so that the bolometer 200 as a whole has M rows of pixels. In each row pair, the laser light is sequentially coupled to sensor 220 after sensor 220 for a total of N sensors 220 by the time the light in the so-called "row line" has reached the left side of the focal plane array. The row waveguide 214 then turns around and again couples with another N sensors 220 on the way back across the focal plane. Finally, the light from the sensors (pixels) 220 interferes with light from the laser source 204 once more before being read by a pair of photodetectors 216 for a homodyne measurement.

There are other suitable row line waveguide 214 routings. Besides going down one row and back an adjacent row as in FIG. 2, for instance, the row waveguides 214 may go down each row, and then be interfered with the laser reference signal, detected, and read out on the other side of the focal plane array. This may be beneficial if the laser linewidth is not narrow enough to accommodate a path length mismatch between the interfering beams. Alternatively, the bolometer may have a row line that goes halfway down one row and returns on an adjacent row, and another row line that goes halfway down the same row from the other side and returns on the other half of the adjacent row.

Fill Factors and Micro-Lens Arrays

FIG. 2 depicts the sensors to be somewhat spaced apart. In practice, the fill factor of the absorbing portions of the sensors 200 should be as high as possible (FIG. 2 does not explicitly show the absorbing region of each sensor 220— the bulk of each sensor 220 absorbs incident LWIR light). A nonideal fill factor may also be compensated with a micro-lens array placed before the focal plane array.

In these devices, a certain amount of the area of the focal plane array is occupied by waveguides or resonators and is thus "dead space" with regards to absorption of LWIR radiation. A convenient way to compensate for this dead space, if desired, is to incorporate a micro-lens array (not shown) just over the focal plane array (for example, in a plane parallel to the plane of FIG. 2). The micro-lens array focuses incident light just gently enough to avoid these non-sensitive regions. The micro-lens array can be made from a LWIR-transparent material, such as molded chalcogenide glass, or from a metasurface structure made of chalcogenide glass or a zinc or lead chalcogenide.

Suppressing and Reducing Sensitivity to Noise

Flicker noise in the photodetectors can be suppressed with an amplitude modulator on the laser output, which enables a lock-in measurement. Alternatively, a frequency shifter may be incorporated into each row line, such that the homodyne measurement becomes a heterodyne measurement. The incoming laser light may also be broken into two portions before the cavity, one of which is immediately frequency shifted, and one of which is not; one of these waveguides can feed all of the row lines, and the other waveguide can serve as a common reference beam for the heterodyne measurements.

Phase-based measurement could be replaced with an amplitude-based measurement (i.e., a direct amplitude measurement of the power returned from the cavities instead of a homodyne or heterodyne measurement). Measuring amplitude instead of phase can reduce the sensitivity to pixel temperature changes due to residual photodetector noise and residual laser intensity modulation but this may not affect the measurement if the scene temperature uncertainty is dominated by thermal noise of the pixel.

Heater Circuitry

The row lines 232 and column lines 234 connected to the filled circles in FIG. 2 illustrate the heater routing. This heater routing allows the sensor resonances to be tuned with row/column addressing. Although heaters 230 make the bolometer resonators tunable, the electrically conductive pathways to the resonators 220 introduce additional thermal conduction between the sensor and the bulk 202. This increases the difficulty of achieving radiation-dominated thermal conduction from the microcavities 220, which allows for better performance.

The heaters 230 can be accessed in a column-by-column fashion. In the rest state, the heater column lines 234 are held to high impedance. To tune the elements along a column, the column line 234 is pulled to ground by a transistor, and then each row line transistor connects each row to a voltage VDD for a prescribed period of time, thus using a pulse-width modulation approach to inject a specific amount of thermal energy into each sensor element in the row. Then the column transistor turns off, and the transistor for the next column turns on, and the process repeats for the next column. In this way, the temperatures of the sensors 220 may be tuned in sequence, column-by-column. As mentioned above, the temperature fluctuations of the sensors 220 due to time-multiplexed heater tuning should not affect the optical measurements. This can be done by making sure that the heating frequency seen by the sensor 220 (the heater clock frequency devices by the number of columns) is much higher than the sensor's thermal low pass 3 dB cutoff frequency. Alternatively, the heating cycle may be synchronized with the optical readout cycle so that the amount of time between heat pulse and optical readout remains constant.

Micro-Ring/Disk Sensor Element: LWIR Absorber and Optical Microcavity

The design of the LWTR absorber and the microcavity are intertwined, so it makes sense to discuss them together.

FIG. 3 illustrates a sensor element 300 based on a micro-ring resonator 320 constructed out of a high-index infrared dielectric, such as Si, SiN, AlN, GaN, $TiO_2$, SiC, or chalcogenide glass. Silicon is a good choice due to its high thermo-optic coefficient and well-developed processing technology. The micro-ring resonator 320 has a partially etched section 322 in the center to reduce the total heat capacity of the sensor 300. The resonance thus circulates in the waveguide along the micro-ring resonator's circumference, which has a full thickness (e.g., 220 nm thickness for a probe wavelength of 1550 nm). The center of the ring is filled with a LWIR-absorbing material 340, such as vertically aligned carbon nanotubes, nanostructured "black gold," graphene patterned to support a plasmonic resonance, pyrolytic carbon (see below), or any other material with high LWIR absorption per heat capacity.

In the case of patterned graphene supporting a plasmonic resonance, there may be an additional graphene sheet or some other sheet of thin, conducting LWIR-transparent material (a transparent conducting oxide, for instance) as well as additional electrical connections to dope the graphene and tune the infrared absorption range. This eliminates radiative thermal exchange pathways outside the absorbed light region, increasing the sensitivity to light in the targeted wavelength range due to increased gain (if the parasitic thermal conductivity to the bulk is even lower than the reduced radiative thermal conductivity), although the response time may increase accordingly.

Finally, there may also be a heating element 330 on the micro-ring resonator 320 (e.g., as discussed above with respect to FIG. 2). This heating element is optional and may include doped silicon (if the disc is made out of silicon), an ultrathin pathway of metal or some conductive ceramic, or graphene. It can be actuated electrically with contacts like those shown in FIG. 2.

A Photonic Crystal Optical Bolometer Thermal Imaging System

Alternatively, the microcavity may take on a photonic crystal design. In this case, instead of the cavity mode circulating around the sensor element, the sensor element includes a photonic crystal cavity formed in a (rectangular) slab of material. The photonic crystal cavity can be evanescently coupled to a row line waveguide, which is not in physical contact with the sensor to keep thermal leakage low and reduce crosstalk between adjacent elements as in FIG. 2. The photonic cavity can also be read out using an out-of-plane readout scheme described below. In either case, the rest of the sensor element besides the photonic crystal cavity resembles the center of the ring in FIG. 3, with an absorbing region, an optional heater, and optional thinned material to reduce heat capacity.

FIG. 4 is a plan view of a sensor element (pixel) 400 in a two-dimensional array of sensor elements in a photonic crystal optical bolometer. Each pixel 400 includes a photonic crystal cavity 420 acting as the readout element as well as some mid-IR or LWIR absorbing material 430 filling the rest of the pixel 400. The pixel 400 is tethered to the bulk of a substrate 402 with tethers 440 featuring low thermal conductance. FIG. 4 shows four spring-like tethers 440 per optical microcavity structure/pixel, but other designs may be used, including the hollow shells described below. For instance, thin straps of a low-thermal conductivity material (for instance, a 2D material or an ALD thin film which is subsequently undercut) can connect the pixel 400 to the bulk substrate 402.

FIGS. 5A and 5B show two possibilities for the photonic crystal cavities (e.g., cavity 420 in FIG. 4) in a photonic crystal optical bolometer. FIG. 5A shows an L3 cavity formed in a 220 nm-thick silicon slab patterned with holes in a triangular lattice. The lattice constant is a=400 nm, and the hole radius is r=100 nm. Three holes are removed in a line from the lattice to create a cavity with a quality factor from $10^3$ to $10^7$ and a resonance wavelength from 1500-1600 nm (e.g., 1550 nm). The locations of the remaining holes are computationally optimized to increase or maximize coupling to the device.

FIG. 5B shows an L4/3 cavity formed in a 220 nm-thick silicon slab patterned with holes in a triangular lattice. The lattice constant is a=400 nm, and the hole radius is r=100 nm. Four holes are added in lieu of three center holes to create a cavity with a quality factor from $10^3$ to $10^7$ and a resonance wavelength from 1500-1600 nm (e.g., 1550 nm). The locations of the remaining holes are computationally optimized to increase or maximize coupling to the device.

Out-of-Plane and In-Plane Optical Readout Path for a Photonic Crystal Optical Bolometer A photonic crystal optical bolometer can be implemented as a focal plane array using in-plane addressing and readout via optical waveguides in a photonic integrated circuit. This bolometer is exceptionally compact, but its successful implementation relies on a fabrication process supporting extremely low leakage thermal isolation of the pixels along with suspended waveguides and perhaps also heaters. (Photodiodes can be added with stamp-integration.)

Other architectures can provide the same functionality using photonic crystal cavities that are addressed with out-of-plane incident light instead of in-plane coupled light. Such devices do not have waveguides alongside the photonic crystal cavities. Instead, the photonic crystal cavities radiate (and, reciprocally, accept light) incident out-of-plane, possibly with a specific far-field profile. Like photonic crystal cavities with in-plane readout, photonic crystal cavities with out-of-plane readout can include a nanostructured thin film structure with some infrared absorber selectively deposited on top, e.g., with post-processing to incorporate in-plane tethers of a different material. Besides photonic crystal cavities, optical bullseye cavities may also be used to achieve a similar effect, along with any other small-mode-volume optical cavity featuring predominantly out-of-plane radiation.

FIG. 6A shows a photonic crystal optical bolometer 600 with out-of-plane readout. The bolometer 600 includes a two-dimensional array 602 of pixels, each of which includes a photonic crystal cavity 620 coated and/or surrounded by mid-TR or LWIR-absorbing material 630. The array 602 is in the focal plane of an optional micro-lens array 622 arranged at one port of a non-polarizing beam splitter 650. A first polarizer 652, second polarizer 654, and near-TR focal plane array 658 are arranged about the other three ports of the beam splitter 650.

In operation, the absorbing material 630 absorbs incident mid-TR or LWIR light 601, heating up the corresponding pixel and shifting the resonance wavelength of the corresponding photonic crystal cavity 620. At the same time, a coherent beam is expanded and split into a probe beam 651 and a local oscillator (LO) beam 653, with control over the splitting ratio to prevent the probe beam 651 from causing the photonic crystal cavities 620 to behave nonlinearly. Polarizers 652 and 654 diagonally polarize these beams before they enter the beam splitter 650, which transmits the probe beam 651 to the photonic crystal cavities 620 via the micro-lens array 622. Each cavity 620 scatters one of the diagonal polarizations into the other and back to the beam splitter 650. This cross-polarized reflection signal is then interfered with the local oscillator beam 653 on the focal plane array 658 through a lens 656. The lens 656 extends the Rayleigh range for the light propagating through the beam splitter 650.

FIG. 6B shows an optical bolometer testbed 699 that probes a photonic crystal (PhC) cavity array 676 with out-of-plane probe light. This testbed illustrates the function of a PhC cavity optical bolometer with bulk components and extra diagnostic features. A production PhC cavity optical bolometer could feature integrated components, all in the same housing, and fewer additional features.

The PhC cavity array 676 senses LWIR light emitted by a NiCr bulb 668 and chopped with a chopper wheel 670. This modulation produces a time-varying spatial modulation of the resonance wavelengths of the PhC cavities in the PhC cavity array 676 that can be probed with a probe beam, also called a cavity signal, and detected using homodyne or heterodyne detection of the probe beam.

The cavity signal and local oscillator (LO) are generated by splitting the output of a continuous wave laser 660 (optionally amplified with a polarization-maintaining fiber amplifier (PMFA) 662) with a polarizing beam splitter (PBS). The LO line is passively path-length matched to the cavity signal using a tunable retroreflector delay line 684. The cavity signal is combined with a linearly polarized (LP) white light from a light-emitting diode (LED) 666 using a dichroic mirror (DM) and is focused onto the PhC cavity 676 with one or more lenses 674. The PhC cavity 676 reflects the cavity signal rotated from the incident polarization, which allows the cavity signal to be isolated from the specular reflection using a PBS. A quarter-wave plate allows the specular reflection to be extracted for comparison to the cavity-only reflection. For homodyne measurements, a balanced photodetector measures the homodyne signal from the recombined cavity reflection and local oscillator, and the result is recorded on an electronic spectrum analyzer (ESA) 694. The DC signal extracted from a low-pass filter (LPF) 692 is used as the feedback signal for a digital proportional-integral-derivative (PID) controller 690 which stabilizes the signal-LO phase difference by actuating a piezo-actuated mirror 688. An electro-optic modulator (EOM) 664 coupled to the laser source 660 provides a known phase noise which can be used to calibrate the frequency noise of the PhC cavity 676. The PhC cavity 676 is mounted in a vacuum chamber (not shown) for thermal isolation and the stage is temperature-stabilized to $\Delta T<0.01K$ using a Peltier plate (not shown).

This system can be modified to incorporate all-optical tuning of the cavity array with short-wavelength light that is shaped by a spatial light modulator (SLM) and shone onto the cavity array. The amount of control light on each cavity is tuned with the SLM, yielding variable heating and therefore variable wavelength trimming of each individual cavity in the array. For instance, a short-wavelength laser could emit a beam at 1310 nm or 1064 nm or another suitable wavelength shorter than 1550 nm. An intensity modulator coupled to the laser modulates this beam, which is added to the beam path between the first PBS and the first DM using another dichroic beam splitter or mirror. The absorbers would (partially) absorb this short-wavelength beam, allowing tuning of pixel temp. The short-wavelength beam would be removed from the return beam path, e.g., by the second DM.

Alternatively, the photonic crystal cavity array can be pre-trimmed prior to system integration to ensure that the full range of variation of cavity resonance wavelengths is much less than the linewidth of the resonances. This may be achieved by, for instance, laser oxidation, photoelectrochemical etching, dry etching, or dielectric deposition individually for each cavity.

FIG. 7A shows an alternative PhC cavity optical bolometer 700a with a carefully designed metasurface 750 instead of a beam splitter and micro-lenses as in FIG. 6A. The bolometer 700a includes an array 702a of pixels or sensor elements, each of which includes an absorber 730a that absorbs incident mid-IR or LWIR light 701 and a photonic crystal cavity 720a whose resonance frequency changes as the absorber 730a changes temperature. Coherent near-IR probe light 751 is fed into the edge of the metasurface 750, which then directs light in a first polarization state (e.g., +45° polarized) upwards (probe light) and light in a second polarization state (e.g., −45° polarized) downwards (local oscillator light). The probe light interacts with the cavity array 702a, which scatters the probe light into the second polarization state, which in turn propagates towards the metasurface 750. The metasurface 750 transmits at least some of this light downwards to interfere with the local oscillator light on a detector array 758 (e.g., CCD/CMOS near-IR FPA).

FIG. 7B shows another variation of an PhC cavity optical bolometer 700b. Instead of injecting the probe light into the side of a metasurface as in FIG. 7A, near-IR probe light is fed in from the side of the cavity array 702b via waveguides 714 that then couple evanescently to PhC cavities 720b that are thermally coupled to respective absorbers 730b. The PhC cavities 720b scatter or couple resonant probe light evanescently coupled from the waveguide 714 down to a near-IR focal plane array 758 placed beneath the pixel array 702b. As the absorbers 730b change temperature in response to variations in the incident mid-IR or LWIR light 701, their resonances shift, changing the amount of probe light coupled to the near-IR focal plane array 758.

Pixel Mechanical Support and Thermal Isolation

For higher sensitivity, each sensor element's thermal exchange with its environment should be dominated by radiation, with conduction being a small contributor to the thermal exchange. Briefly, if the sensor element has electrical contacts, it may be supported by long, thin metallic tethers which fold back and forth underneath the sensor. If the sensor does not have electrical contacts, then these tethers may be made of a nonconducting material, such as glass, ceramic, or a metal with poor conductivity as dictated by fabrication constraints. Besides the sensor elements, the row line may also be suspended, depending on the fabrication approach. This may be achieved using expanded support structures in which the waveguide is widened over a short region to reduce susceptibility to perturbation, and then a support structure is introduced.

In addition, the sensor element can be elevated by a distance of $\lambda_{LWIR}/4$ from a reflective undersurface (the so-called "Salisbury Screen") to increase the absorption of incident light. Here, $\lambda_{LWIR}$ roughly represents the median wavelength of interest of the incident light. Raising the sensor element above the reflective undersurface prevents radiative thermal exchange between the sensor element and the bulk of the supporting chip or support. Suitable reflective undersurfaces include indium tin oxide (ITO)-coated quartz, which reflects mid-IR light. For out-of-plane readout, this ITO-coated quartz also offers the benefit of reducing reflection of the near-IR probe light off of the undersurface and into the absorbers (as may be the case for a reflective metal undersurface) and thus reduces noise and thermal resonance-shifted effects associated with absorption of probe light. Other suitable support substrates include anti-reflection (AR)-coated glass, which does not reflect mid-IR light, but reduces reflection of probe light into the absorbers.

FIG. 8A shows a hollow ceramic shell that can support and thermally isolate a pixel in a PhC or micro-ring/disk cavity optical bolometer like those described above. This support is fabricated using photolithography with an intentional defocus to produce a rounded-top pillar structure of cross-linked negative photoresist on the desired substrate. The diameter of this support can range from 1.0 μm to 1.5 μm, and the support's height can range from 1.5 μm to 2.5 μm. The height can be chosen to increase or maximize mid-IR absorption in the presence of mid-IR reflection from the substrate (for instance, using a λ/4 quarter-wavelength back-reflector and a mid-IR reflective substrate as explained immediately above). The width can be determined by mechanical integrity and lithography constraints. Once the photoresist pillar has been formed, it is coated with 20-40 nm of $ZrO_2$ using atomic layer deposition. A focused ion beam (FIB) drills a hole in the coated pillar, and oxygen plasma remove the original photoresist structure through the hole, leaving a hollow shell of $ZrO_2$.

Generally, supports like those in FIG. 8A can be made of a material with low thermal conductivity and high strength, preferably able to be deposited via ALD. Other suitable materials may include amorphous $SiO_2$, $HfO_2$, and WOx.

FIGS. 8B-8E show EDS-SEM measurements verifying removal of the original resist material for a pillar with a FIB-processed hole (FIGS. 8B and 8C), compared to one without (FIGS. 8D and 8E), where both pillars were subjected to oxygen plasma. The support with no FIB hole shows a clear carbon signal in the EDS-SEM horizontal line scan (indicated by the horizontal dashed line in FIG. 8B), whereas the support with a FIB hole shows no such signal.

Making a PhC Cavity with Pyrolytic Carbon Pillar Absorbers

The absorbers on PhC or micro-ring/disk cavity optical bolometers can be made of pillars of pyrolytic carbon, which are especially effective at absorbing incident mid-IR or LWIR radiation. Pyrolytic carbon pillars can be fabricated using photolithography to produce pillars of negative photoresist in the desired locations for the carbon pillars, e.g., surrounding a PhC cavity. Prior to pyrolysis, the pillars are approximately 4 μm to 6 μm in diameter and 5 μm to 12 μm tall. The pillars are pyrolyzed in a tube furnace under a $H_2$:Ar forming gas flow, with the temperature slowly ramping to 800° C., then remaining at 800° C. for a period of time, before slowly cooling back to room temperature. After pyrolysis, the diameter of the pillars shrinks by about a half and their height decreases slightly (e.g., by about 1-2 μm) due to the release of water vapor and other pyrolysis reaction products.

FIG. 9A illustrates a process 900 for fabricating PhC pixels for an optical bolometer that operates with out-of-plane reflection measurements of the PhC pixel resonances. This process 900 starts with a silicon-on-insulator (SOI) wafer 902 (901). The SOI chip 902 has a silicon layer that is 220 nm thick on top of a 2,000 nm buried oxide layer, which in turn is on a silicon substrate. Positive-tone e-beam lithography and reactive ion etching (RIE) patterns a PhC 920 into the SOI wafer's top layer (903). (High-resolution, deep ultraviolet optical lithography could also be used to pattern the PhC 920.) This yields a "stamp" with a PhC structure in the middle flanked on all sides by designated locations for placement of absorber structures.

Next, absorbing pyrolytic carbon pillars are formed around the PhC cavity 920 as described above. The upper surface is coated with negative photoresist, which is exposed and developed to form absorber pillars 938 (905) as shown in the upper right inset in FIG. 9B. The absorber pillars are pyrolyzed by ramping the temperature to 800° C. in a $H_2$:Ar ambient environment, holding the pillars at that temperature, then allowing the pillars to cool (907). This yields pyrolytic carbon pillars 930 as shown in FIG. 9B. A gentle application of oxygen plasma to the PhC cavity 920 and pyrolytic carbon pillars 930 removes carbonaceous residues left over from the absorber fabrication process, and an HF etch releases the stamp (909).

The supports for the PhC pixel are made separately on a substrate (e.g., glass) that is transparent to the probe wavelength. This substrate can be coated with ITO to increase absorption of mid-IR or LWIR light by the pyrolytic carbon pillars 930 or an AR coating to reduce unintentional absorption of probe light in the absorbers, which otherwise contributes photon shot noise and probe-dependent cavity heating. As explained above with respect to FIG. 8A, the supports are formed by making molds of negative photoresist (e.g., diluted mr-DWL 5) on the surface of the substrate (911). These molds are coated with layers of $ZrO_2$ that are a few tens of nanometers thick using ALD (913). Then FIB is using to drill a 100 nm hole in each support, and each mold is etched away with an oxygen plasma asher (915), leaving the hollow, insulating supports 940. The suspended stamp is then broken free from the SOI chip 902 using a tungsten tip and transferred onto the supports 940 (917). FIG. 9C shows an SEM of a stamp with pillars and a PhC cavity supported above a transparent substrate by four hollow supports.

For more scalable transfer of released bolometer pixel membranes onto the support structures, an ad-hoc designed elastomeric stamp (for instance, composed of polydimethylsiloxane) can be attached simultaneously to an array of stamps, then used to tear the stamps from their tethers, and place them on top of the supports. For a high fill factor without lateral silicon tethers, the HF undercut step can be timed to leave each stamp sitting on top of four narrow (<100 nm) tips of silicon, which may be similarly severed by pulling away the stamp.

FIGS. 10A, 10B, 11A, and 11B illustrate the performance of absorbers and pixels made using the process 900 shown in FIG. 9A. FIG. 10A is an SEM of a hexagonal array of absorbers on a large region of undercut silicon-on-insulator (SOI) (with a silicon substrate/2,000 nm air/220 nm Si layer structure as in FIG. 9A) and evaluated their mid-IR reflection and transmission characteristics compared to bare regions of undercut SOI using FTIR. The array in FIG. 10A has a pre-pyrolyzation pillar diameter of 5.2 μm and a pre-pyrolyzation pillar-pillar separation of 2.4 μm. FIG. 10B is a plot of the estimated absorptance as inferred from FTIR data as a function of wavenumber for pyrolyzed hexagonal arrays with pre-pyrolyzed pillar diameters from 4.2 to 6.0 μm and pre-pyrolyzed pillar-to-pillar separations of 2.4 μm. FIG. 10B shows a clear trend of increasing absorptance and a longer-wavelength maximum absorption range for increasing absorber size, suggesting a Mie-type, low-Q (Q<10) dielectric resonance absorption mechanism. FIGS. 11A and 11B show measured line-scans for two different L3 PhC cavities (e.g., as in FIG. 5A) on fabricated bolometer pixel stamps after incorporation of pyrolyzed carbon absorbers and ashing to remove residues, demonstrating resilience of the PhC cavity resonances to the absorber integration process.

Probe Power for Thermal Noise-Limited Sensitivity

In each of the optical bolometers described above, phase measurement is a sensitive way to detect changes in the resonance frequency of the optical cavity (micro-ring/disk or photonic crystal) used to read out the sensor temperature. The phase can be measured in a homodyne architecture where light coupled to the cavity is interfered with a reference beam to produce an interference pattern whose intensity is measured with a photodetector. The shot noise of the cavity reflection limits the cavity's sensitivity to the temperature of the sensor element. However, beyond a certain probe power, the noise in sensor temperature estimation due to shot noise becomes smaller than the stochastic fluctuation of the sensor temperature due to equilibrium thermal exchange between the sensor and its environment.

To calculate this threshold probe power, we model the interaction between the probe light and the cavity using temporal coupled-mode theory. We then calculate the final power (after interfering the probe beam with a reference beam) incident on a detector and from that extract the shot noise of the measurement, which may be the main noise source if the power of the reference beam is high enough to dominate over dark current noise. Finally, we equate that to the noise on the detector due to thermal fluctuations of the sensitive element, which incorporates the responsivity of the system, and solve for probe power. We arrive at the following minimum probe power:

$$P = \frac{\hbar\omega}{8k_B} GQ^{-2}\Gamma^{-2}\left(\frac{T}{n}\frac{dn}{dT}\right)^{-2}$$

for thermal fluctuation-limited sensitivity, where $\hbar\omega$ is the probe photon energy, $k_B$ is Boltzmann's constant, G is the thermal conductance between the sensor element and its environment (both conductive and radiative contributions), Q is the quality factor of the cavity, $\Gamma$ is the proportion of cavity mode electrical field energy confined to the cavity material with thermo-optic response, n is the cavity material index, and T is temperature, such that dn/dT is the thermo-optic coefficient of the cavity. This equation assumes that the probe light is critically coupled to the cavity, reducing the cavity input power.

As an example, consider probe light with a wavelength of 1550 nm, thermal radiation-limited thermal conductivity into $2\pi$ steradians from a 10 µm-diameter silicon disk resonator for G, Q=200,000, $\Gamma$=1, and room temperature operation. This yields a minimum probe power of P=64 fW, which is an extremely low power, very far away from the onset of nonlinear effects which may limit performance. At this probe power level, there is plenty of room for nonidealities while still being able to achieve thermal-fluctuation limited performance. For instance, we can use time-multiplexed readout of the sensors in a single row, where each sensor is being addressed a fraction of the time and uses a miniscule probe power.

Readout Nonideality Mitigation

In practice, schemes for reading out the cavities in each optical bolometer pixel can suffer from various non-idealities. Phase-based readout, as discussed above, is susceptible to induction of mechanical vibrations into spurious signals. Direct detection, in which reflected amplitude instead of the phase is used to measure shifts in the resonances (without the use of interferometric measurement), is susceptible to laser amplitude noise, non-ideal photodetector noise (this can potentially be somewhat mitigated by using an interferometer to incorporate coherent optical gain), and amplitude noise due to mechanical vibrations causing fluctuation in the coupling conditions between the cavity and probe light. Phase-based readout and direct detection are both susceptible to changes in the laser source wavelength.

One way of mitigating most of these noise sources is to sweep the laser wavelength across a known wavelength range and monitor the relative timing of the amplitude peak to infer changes in the pixel temperature. For instance, the laser wavelength can be swept across the resonance and the time intervals during which the amplitude signal is increasing versus decreasing may be compared to infer shifts in the resonance. However, this relies on being able to produce predictable and repeatable wavelength sweeps and is susceptible to laser source wavelength fluctuation.

To mitigate the impact of source laser wavelength drift, any of the readout schemes above can be extended to a self-referenced readout scheme, where each pixel supports at least two (instead of just one) optical resonances (e.g., either two single-mode photonic crystal cavities or a single multi-mode cavity) that feature different wavelength dependence with respect to temperature as a result of different confinement factors of their optical modes to the silicon or other dielectric material. In this case, one could then infer pixel temperature even in the presence of low-frequency laser wavelength noise by measuring the difference between the two resonance wavelengths, either directly using a wavelength sweep or indirectly using phase or amplitude measurements.

Other readout nonidealities include those associated with absorption of the probe light in the pixel, either by absorption mechanisms intrinsic to the dielectric used (for instance, two-photon absorption in the case of Si) or by absorption of stray probe light in the mid-IR absorbing materials either on- or off-resonance. This gives rise to two distinct phenomena affecting performance: (1) photo-thermal shot noise due to stochastic absorption of probe light by the pixel; and (2) changes in cavity resonance wavelength caused by the probe beam. If the proportion of probe light absorbed in the pixel varies over the pixel's optical resonance peak, any variations in the wavelength difference between the laser and the cavity resonance will yield thermo-optic nonlinearities that dynamically affect the cavity resonance. This may result in "dragging" of the cavity resonance wavelength by a probe wavelength scan, leading to an inaccurate measurement of the unprobed "rest" cavity resonance wavelength as well as an apparent asymmetric cavity lineshape. It may also result in effective stabilization of the cavity resonance due to feedback effects, which resembles an increase in the apparent ("effective") thermal conductivity returning the cavity resonance to its steady state wavelength. This could then cause a proportional decrease in the bolometer responsivity for linear readout mechanisms based on small-signal cavity temperature fluctuations with a constant probe wavelength.

These thermal nonidealities can be managed by designing the bolometer pixel and readout mechanism appropriately. First, use absorbers that feature strong mid-IR but weak near-IR and visible absorption. Many transparent materials, including ceramics and polymers, absorb in the mid-IR due to vibrational peaks, but the absorption in the mid-IR is often weak or features complex wavelength variations that might complicate the design of a broadband absorber based on such materials. Transparent conductors, such as doped and/ or nanostructured graphene (see above) or perhaps nanostructured ITO, can be used as alternative absorbers.

Second, the pixel should be designed with sufficient physical separation between the mid-IR absorbers and the PhC cavity that absorbs the probe beam. The physical separation can be smaller for lower unintended PhC-to-absorber scattering. For a PhC pixel like those described above, the distance between the PhC and the absorbers (pyrolytic carbon pillars) is typically a 7-10 μm.

Third, other design choices can be made to reduce or minimize potential scattering of probe light into the absorbers, such as using an antireflection-coated substrate for the bolometer supports (described above) to reduce or minimize reflection of probe light into the absorbers, and/or (in the case of out-of-plane bolometer pixel probing) careful design of the optics used to focus probe light onto the resonance to avoid probe illumination from reaching the absorbers.

Fourth, the bolometer may use a readout scheme that reduces or minimizes the impact of these thermal effects. For instance, one may use two laser wavelengths, one slightly below the cavity resonance and one slightly above, to probe the cavity as shown in FIG. 12. These beams can be generated simultaneously by different lasers or sequentially by rapidly tuning or switching a single laser. In this way, when the cavity wavelength shifts due to variation in incident thermal radiation, the absorbed proportion of one of the probe wavelengths increases while the other decreases, counteracting the thermal cavity stabilization effect and reducing the effective thermal conductivity of the cavity.

Fifth, the impact of thermal effects on readout may also be reduced by adopting a non-small-signal readout scheme, such as a wavelength-swept scheme as described above.

Sixth, the probe power can simply be reduced or minimized within the noise constraints of the cavity readout signal path. As mentioned above, coherent measurement of the cavity readout signal can be used to achieve coherent optical gain and thus reduce the probe power necessary to achieve a given signal-to-noise of the probe signal measurement. If the continuous-wave (CW) local oscillator power is too low to achieve shot-noise-limited coherent measurement of the cavity signal, one may also pulse the cavity probe beam and local oscillator. Comparing CW versus pulsed readout schemes using the same time-averaged optical powers, the pulsed scheme has the advantage of concentrating the same number of probe photons per measurement cycle into a smaller time interval, allowing rejection of photodetector noise during time intervals when the probe illumination is known to be off. Shot noise from absorbed probe light could also be reduced by using longer probe wavelengths, or by using squeezed probe light.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A device for imaging thermal infrared radiation, the device comprising:
   an array of pixels, each pixel in the array of pixels comprising an absorbing material to absorb incident thermal infrared radiation and a photonic crystal cavity in thermal communication with the absorbing material, absorption of the incident thermal infrared radiation by the absorbing material causing a shift in a resonance of the photonic crystal cavity;
   a coherent light source, in optical communication with the array of pixels, to couple probe light to the photonic crystal cavities, the probe light probing the shifts in the resonances of the photonic crystal cavities;
   a beam splitter, in optical communication with the coherent light source, to split off a portion of the probe light as a local oscillator reference signal; and
   a detector array, in optical communication with the array of pixels, to detect interference of the probe light scattered by the photonic crystal cavities with the local oscillator reference signal, the interference representing the shifts in the resonances of the photonic crystal cavities.

2. The device of claim 1, wherein the absorbing material comprises a pyrolytic carbon pillar having a diameter of about 2 µm to about 3 µm and a height of about 3 µm to about 10 µm.

3. The device of claim 1, wherein the absorbing material comprises at least one of pyrolytic carbon pillars, vertically aligned carbon nanotubes, a layer of nanostructured black gold, a ceramic layer, or a polymer layer.

4. The device of claim 1, wherein the incident thermal infrared radiation comprises at least one of mid-infrared radiation or long-wave infrared radiation.

5. The device of claim 1, wherein the resonance of the photonic crystal cavity has a center wavelength of between about 1450 nm and about 1650 nm.

6. The device of claim 1, further comprising:
   a substrate; and
   hollow pillars, extending from the substrate, to support pixels in the array of pixels above the substrate and to thermally isolate the array of pixels from the substrate.

7. The device of claim 6, wherein each of the hollow pillars has a diameter of about 1.0 µm to about 1.5 µm, a height of about 1.5 µm to about 2.5 µm, and a thickness of about 20 nm to about 40 nm.

8. The device of claim 6, wherein the substrate is coated with at least one of an indium tin oxide layer or an anti-reflection coating.

9. The device of claim 1, further comprising:
   a substrate; and
   tethers, extending from the substrate, to support pixels in the array of pixels above the substrate and to thermally isolate the array of pixels from the substrate.

10. The device of claim 1, further comprising:
    a metasurface, in optical communication with the array of pixels, the coherent light source, and the detector array, to direct the probe light from the coherent light source to the array of pixels and to direct the probe light scattered by the photonic crystal cavities to the detector array.

11. The device of claim 1, further comprising:
    a waveguide, in optical communication with the coherent light source and evanescently coupled to the array of pixels, to guide the probe light from the coherent light source and to evanescently couple the probe light to the photonic crystal cavities in the array of pixels.

12. A device for imaging thermal infrared radiation, the device comprising:
    an array of pixels, each pixel in the array of pixels comprising an absorbing material to absorb incident thermal infrared radiation and a photonic crystal cavity in thermal communication with the absorbing material, absorption of the incident thermal infrared radiation by the absorbing material causing a shift in a resonance of the photonic crystal cavity;
    a light source, in optical communication with the array of pixels, to couple probe light to and from the photonic crystal cavities, the probe light probing the shifts in the resonances of the photonic crystal cavities;
    a detector array, in optical communication with the array of pixels, to detect the probe light scattered by the photonic crystal cavities;
    a substrate; and
    hollow pillars, extending from the substrate, to support pixels in the array of pixels above the substrate and to thermally isolate the array of pixels from the substrate,
    wherein the hollow pillars support the array of pixels above the substrate by a distance of about $\lambda_{LWIR}/4$, where $\lambda_{LWIR}$ is a median wavelength of the incident thermal infrared radiation.

13. A method of making an optical bolometer, the method comprising:
    forming a photonic crystal cavity in a first substrate;
    forming an absorbing pyrolytic carbon pillar on the first substrate in thermal communication with the photonic crystal cavity;
    separating a stamp comprising the photonic crystal cavity and the absorbing pyrolytic carbon pillar from the first substrate; and disposing the stamp on supports extending from a second substrate, the supports thermally isolating the stamp from the second substrate.

14. The method of claim 13, wherein forming the absorbing pyrolytic carbon pillar on the first substrate comprises:
    forming a pillar made of polymer on the first substrate; and
    pyrolyzing the pillar to yield the absorbing pyrolytic carbon pillar.

15. The method of claim 14, wherein forming the pillar on the first substrate comprises forming the pillar about 7 μm to about 10 μm from the photonic crystal cavity.

16. The method of claim 14, wherein, after the pyrolyzing, the pillar has a diameter of about 2 μm to about 3 μm and a height of about 3 μm to about 10 μm.

17. The method of claim 13, further comprising, before disposing the stamp on the supports:
    forming a polymer mold on the second substrate;
    disposing an oxide layer on the polymer mold;
    forming a hole in the oxide layer; and
    removing the polymer mold from under the oxide layer through the hole in the oxide layer to yield one of the supports.

18. The method of claim 17, wherein each support has a diameter of about 1.0 μm to about 1.5 μm, a height of about 1.5 μm to about 2.5 μm, and a thickness of about 20 nm to about 40 nm.

19. The method of claim 17, further comprising:
    coating the second substrate with at least one of an indium tin oxide layer or an anti-reflection coating.

20. The method of claim 13, further comprising:
    disposing a metasurface in optical communication with the photonic crystal cavity to direct probe light from a light source to the photonic crystal cavity and to direct the probe light scattered by the photonic crystal cavity to a detector array.

21. A device for imaging mid-infrared (IR) and/or long-wave infrared (LWIR) radiation, the device comprising:
    a substrate;
    an array of pixels, each pixel in the array of pixels comprising at least one pyrolytic carbon pillar to absorb incident mid-IR and/or LWIR radiation and a photonic crystal cavity in thermal communication with the at least one pyrolytic carbon pillar, absorption of the incident mid-IR and/or LWIR radiation by the at least one pyrolytic carbon pillar causing a shift in a resonance of the photonic crystal cavity;
    hollow pillars, extending from the substrate, to support each pixel in the array of pixels above the substrate and to thermally isolate the array of pixels from the substrate;
    a light source, in optical communication with the array of pixels, to couple probe light to the photonic crystal cavities, the probe light probing the shifts in the resonances of the photonic crystal cavities; and
    a detector array, in optical communication with the array of pixels, to detect the probe light scattered by the photonic crystal cavities.

* * * * *